(12) United States Patent  (10) Patent No.: US 8,583,466 B2
Margulies et al.  (45) Date of Patent: Nov. 12, 2013

(54) SYSTEM AND METHOD FOR ROUTING WORKFLOW ITEMS BASED ON WORKFLOW TEMPLATES IN A CALL CENTER

(75) Inventors: Edwin Kenneth Margulies, Las Vegas, NV (US); Eli Ben Borodow, San Diego, CA (US); Ran Ezerzer, San Diego, CA (US); Ali Aljane, San Diego, CA (US); William Scott Seebauer, San Diego, CA (US); Imed Yahmadi, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1282 days.

(21) Appl. No.: 11/277,125

(22) Filed: Mar. 21, 2006

(65) Prior Publication Data

US 2007/0038499 A1  Feb. 15, 2007

Related U.S. Application Data

(60) Provisional application No. 60/706,561, filed on Aug. 9, 2005.

(51) Int. Cl.
*G06Q 10/00* (2012.01)
(52) U.S. Cl.
USPC ........................................................ 705/7.26
(58) Field of Classification Search
USPC ................................................ 705/7.13, 7.26
See application file for complete search history.

(56) References Cited

U.S. PATENT DOCUMENTS

| | | | |
|---|---|---|---|
| 5,185,780 A | | 2/1993 | Leggett et al. |
| 5,299,260 A | * | 3/1994 | Shaio ........................ 379/266.07 |
| 5,479,487 A | | 12/1995 | Hammond |
| 5,535,256 A | * | 7/1996 | Maloney et al. .............. 379/309 |
| 5,557,515 A | | 9/1996 | Abbruzzese et al. |
| 5,563,937 A | | 10/1996 | Bruno et al. |

(Continued)

FOREIGN PATENT DOCUMENTS

| | | |
|---|---|---|
| EP | 0806858 | 11/1997 |
| EP | 0920224 | 6/1999 |

(Continued)

OTHER PUBLICATIONS

Workflow Template: Using the WFT Development Environment Template Software, 1998.*

(Continued)

*Primary Examiner* — Scott L Jarrett
(74) *Attorney, Agent, or Firm* — Fliesler Meyer LLP

(57) ABSTRACT

The present invention facilitates the creation and implementation of Workflow Templates and also the designation of linkage between these templates and specific projects dealing with different media type handling. Workflow Templates are used to automatically generate user interface views which will be used by agents, knowledge workers, supervisors and customers. Such Workflow Templates provide the means to create, define and store the name and definition of and "trigger points" for each workflow item. The trigger points for when a document is used are also determined when creating the template. Further, in creating a Workflow Templates the administrator can instruct the system to save scripts associated with the template that can be saved as XML, EDI, JSP, CGI, VXML, etc. so as to be able to automatically generate documents or logic flows consistent with the target media type for the anticipated interactions with customers.

20 Claims, 22 Drawing Sheets

(56) References Cited

U.S. PATENT DOCUMENTS

| | | | |
|---|---|---|---|
| 5,590,188 A | 12/1996 | Crockett | |
| 5,684,870 A | 11/1997 | Maloney et al. | |
| 5,703,943 A | 12/1997 | Otto | |
| 5,706,507 A | 1/1998 | Schloss | |
| 5,742,675 A | 4/1998 | Kilander et al. | |
| 5,774,660 A | 6/1998 | Brendel et al. | |
| 5,774,670 A | 6/1998 | Montulli | |
| 5,790,650 A | 8/1998 | Dunn et al. | |
| 5,822,306 A | 10/1998 | Catchpole | |
| 5,825,869 A | 10/1998 | Brooks et al. | |
| 5,825,870 A | 10/1998 | Miloslavsky | |
| 5,826,252 A | 10/1998 | Wolters et al. | |
| 5,841,854 A | 11/1998 | Schumacher et al. | |
| 5,889,799 A | 3/1999 | Grossman et al. | |
| 5,895,471 A | 4/1999 | King et al. | |
| 5,903,641 A | 5/1999 | Tonisson | |
| 5,914,713 A | 6/1999 | Nario et al. | |
| 5,923,745 A | 7/1999 | Hurd | |
| 5,940,496 A | 8/1999 | Gisby et al. | |
| 5,943,416 A | 8/1999 | Gisby | |
| 5,953,406 A | 9/1999 | LaRue et al. | |
| 5,960,404 A * | 9/1999 | Chaar et al. | 705/8 |
| 5,974,392 A | 10/1999 | Endo | |
| 5,978,465 A | 11/1999 | Corduroy et al. | |
| 5,982,873 A | 11/1999 | Flockhart et al. | |
| 5,999,911 A * | 12/1999 | Berg et al. | 705/7.26 |
| 6,012,088 A | 1/2000 | Li et al. | |
| 6,014,688 A | 1/2000 | Venkatraman et al. | |
| 6,029,141 A | 2/2000 | Bezos et al. | |
| 6,044,355 A | 3/2000 | Crockett et al. | |
| 6,046,762 A | 4/2000 | Sonesh et al. | |
| 6,070,242 A | 5/2000 | Wong et al. | |
| 6,073,178 A | 6/2000 | Wong et al. | |
| 6,134,530 A | 10/2000 | Bunting et al. | |
| 6,163,607 A | 12/2000 | Bogart et al. | |
| 6,173,053 B1 * | 1/2001 | Bogart et al. | 379/266.01 |
| 6,173,312 B1 | 1/2001 | Atarashi et al. | |
| 6,175,564 B1 | 1/2001 | Miloslavsky et al. | |
| 6,185,288 B1 | 2/2001 | Wong | |
| 6,188,761 B1 | 2/2001 | Dickerman et al. | |
| 6,201,804 B1 | 3/2001 | Kikinis | |
| 6,225,998 B1 * | 5/2001 | Okita et al. | 715/853 |
| 6,226,748 B1 | 5/2001 | Bots et al. | |
| 6,229,888 B1 | 5/2001 | Miloslavsky | |
| 6,230,197 B1 | 5/2001 | Beck et al. | |
| 6,233,332 B1 | 5/2001 | Anderson et al. | |
| 6,243,092 B1 * | 6/2001 | Okita et al. | 715/866 |
| 6,259,909 B1 | 7/2001 | Ratayczak et al. | |
| 6,263,066 B1 | 7/2001 | Shtivelman et al. | |
| 6,295,353 B1 | 9/2001 | Flockhart et al. | |
| 6,295,551 B1 | 9/2001 | Roberts et al. | |
| 6,298,045 B1 | 10/2001 | Pang et al. | |
| 6,298,356 B1 | 10/2001 | Jawahar et al. | |
| 6,308,188 B1 * | 10/2001 | Bernardo et al. | 715/234 |
| 6,363,145 B1 | 3/2002 | Shaffer et al. | |
| 6,373,836 B1 | 4/2002 | Deryugin et al. | |
| 6,389,400 B1 | 5/2002 | Bushey et al. | |
| 6,424,624 B1 | 7/2002 | Galand et al. | |
| 6,487,290 B1 | 11/2002 | Le Grand | |
| 6,487,291 B1 | 11/2002 | Walker et al. | |
| 6,493,447 B1 | 12/2002 | Goss | |
| 6,493,695 B1 * | 12/2002 | Pickering et al. | 706/47 |
| 6,496,867 B1 | 12/2002 | Beser et al. | |
| 6,535,600 B1 | 3/2003 | Fisher et al. | |
| 6,553,113 B1 | 4/2003 | Dhir et al. | |
| 6,570,980 B1 | 5/2003 | Baruch | |
| 6,574,331 B1 | 6/2003 | Forsythe et al. | |
| 6,597,685 B2 | 7/2003 | Miloslavsky et al. | |
| 6,606,740 B1 * | 8/2003 | Lynn et al. | 717/100 |
| 6,618,710 B1 | 9/2003 | Zondervan et al. | |
| 6,625,141 B1 | 9/2003 | Glitho et al. | |
| 6,628,777 B1 | 9/2003 | McIllwaine | |
| 6,661,882 B1 | 12/2003 | Muir et al. | |
| 6,665,395 B1 | 12/2003 | Busey et al. | |
| 6,674,713 B1 | 1/2004 | Berg et al. | |
| 6,674,852 B1 | 1/2004 | Hamilton | |
| 6,681,010 B1 | 1/2004 | Anderson et al. | |
| 6,697,858 B1 | 2/2004 | Ezerzer et al. | |
| 6,704,410 B1 | 3/2004 | McFarlane et al. | |
| 6,718,366 B2 | 4/2004 | Beck et al. | |
| 6,724,887 B1 | 4/2004 | Eilbacher et al. | |
| 6,732,178 B1 | 5/2004 | Van Horne et al. | |
| 6,735,299 B2 | 5/2004 | Krimstock | |
| 6,744,858 B1 | 6/2004 | Ryan et al. | |
| 6,745,235 B2 | 6/2004 | Baca et al. | |
| 6,751,310 B1 | 6/2004 | Crossley | |
| 6,760,324 B1 | 7/2004 | Scott et al. | |
| 6,763,104 B1 | 7/2004 | Judkins et al. | |
| 6,771,760 B1 | 8/2004 | Vortman et al. | |
| 6,779,020 B1 | 8/2004 | Henrick | |
| 6,789,876 B2 | 9/2004 | Barclay et al. | |
| 6,798,768 B1 | 9/2004 | Gallick et al. | |
| 6,801,620 B2 | 10/2004 | Smith et al. | |
| 6,865,268 B1 | 3/2005 | Matthews et al. | |
| 6,879,685 B1 | 4/2005 | Peterson et al. | |
| 6,895,558 B1 | 5/2005 | Loveland | |
| 6,904,161 B1 * | 6/2005 | Becker et al. | 382/128 |
| 6,910,074 B1 | 6/2005 | Amin et al. | |
| 6,912,272 B2 * | 6/2005 | Kirk et al. | 379/88.01 |
| 6,934,379 B2 | 8/2005 | Falcon et al. | |
| 6,970,829 B1 | 11/2005 | Leamon | |
| 7,039,176 B2 | 5/2006 | Borodow et al. | |
| 7,062,031 B2 * | 6/2006 | Becerra et al. | 379/265.01 |
| 7,069,536 B2 * | 6/2006 | Yaung | 717/102 |
| 7,085,834 B2 | 8/2006 | Delany et al. | 709/225 |
| 7,103,171 B1 * | 9/2006 | Annadata et al. | 379/265.12 |
| 7,155,720 B2 * | 12/2006 | Casati et al. | 718/104 |
| 7,228,547 B2 * | 6/2007 | Yaung | 718/106 |
| 7,254,641 B2 * | 8/2007 | Broughton et al. | 709/240 |
| 7,289,966 B2 * | 10/2007 | Ouchi | 705/7 |
| 7,305,082 B2 * | 12/2007 | Elazar et al. | 379/265.07 |
| 7,321,298 B2 * | 1/2008 | Judkins et al. | 340/506 |
| 7,373,410 B2 | 5/2008 | Monza et al. | |
| 7,382,773 B2 * | 6/2008 | Schoeneberger et al. | 370/353 |
| 7,406,575 B2 * | 7/2008 | Lam et al. | 711/161 |
| 7,454,466 B2 * | 11/2008 | Bellotti et al. | 709/206 |
| 7,568,001 B2 * | 7/2009 | McPartlan et al. | 709/202 |
| 7,581,011 B2 * | 8/2009 | Teng | 709/229 |
| 7,647,595 B2 * | 1/2010 | Chandrasekaran | 719/318 |
| 7,734,032 B1 * | 6/2010 | Kiefhaber et al. | 379/265.01 |
| 7,792,278 B2 * | 9/2010 | Watson et al. | 379/266.1 |
| 7,792,773 B2 * | 9/2010 | McCord et al. | 706/47 |
| 7,949,588 B2 * | 5/2011 | Willis | 705/35 |
| 2001/0011228 A1 | 8/2001 | Shenkman | |
| 2001/0024497 A1 | 9/2001 | Campbell et al. | |
| 2002/0001300 A1 | 1/2002 | Miloslavsky et al. | |
| 2002/0029161 A1 | 3/2002 | Brodersen | |
| 2002/0032706 A1 | 3/2002 | Perla | |
| 2002/0038309 A1 * | 3/2002 | Perkins et al. | 707/104.1 |
| 2002/0067822 A1 | 6/2002 | Cohen et al. | |
| 2002/0091817 A1 | 7/2002 | Hill et al. | |
| 2002/0101979 A1 | 8/2002 | Borodow et al. | |
| 2002/0120459 A1 * | 8/2002 | Dick et al. | 705/1 |
| 2003/0009373 A1 * | 1/2003 | Ensing et al. | 705/10 |
| 2003/0018508 A1 * | 1/2003 | Schwanke | 705/9 |
| 2003/0018702 A1 * | 1/2003 | Broughton et al. | 709/202 |
| 2003/0023675 A1 * | 1/2003 | Ouchi et al. | 709/203 |
| 2003/0069780 A1 | 4/2003 | Hailwood et al. | |
| 2003/0093533 A1 | 5/2003 | Ezerzer et al. | |
| 2003/0101082 A1 | 5/2003 | Volpe et al. | |
| 2003/0174830 A1 | 9/2003 | Boyer et al. | |
| 2003/0182135 A1 | 9/2003 | Sone | |
| 2003/0200527 A1 * | 10/2003 | Lynn et al. | 717/102 |
| 2004/0057569 A1 | 3/2004 | Busey et al. | |
| 2004/0101127 A1 | 5/2004 | Dezonno et al. | |
| 2004/0141508 A1 * | 7/2004 | Schoeneberger et al. | 370/401 |
| 2004/0210475 A1 | 10/2004 | Starnes et al. | |
| 2004/0249650 A1 | 12/2004 | Freedman et al. | |
| 2005/0010475 A1 | 1/2005 | Perkowski et al. | |
| 2005/0015711 A1 | 1/2005 | Yamamoto et al. | |
| 2005/0021713 A1 | 1/2005 | Dugan et al. | |
| 2005/0043986 A1 | 2/2005 | McConnell et al. | |
| 2005/0080705 A1 | 4/2005 | Chaganti | |
| 2005/0125487 A1 * | 6/2005 | O'Connor et al. | 709/201 |

| | | | |
|---|---|---|---|
| 2006/0062374 A1 | 3/2006 | Gupta | |
| 2006/0143034 A1* | 6/2006 | Rothermel et al. | 705/1 |
| 2006/0179064 A1* | 8/2006 | Paz et al. | 707/10 |
| 2006/0262922 A1 | 11/2006 | Margulies | |
| 2007/0239515 A1 | 10/2007 | Hernandez et al. | |

FOREIGN PATENT DOCUMENTS

| | | |
|---|---|---|
| EP | 1073249 | 1/2001 |
| IE | WO0227571 A2 | 4/2002 |
| JP | H08287162 | 11/1996 |
| JP | 11-317817 | 11/1999 |
| JP | 2000078292 | 3/2000 |
| JP | 2000148879 | 5/2000 |
| JP | 2002-007354 | 1/2002 |
| JP | 2003-203148 A | 7/2003 |
| JP | 2003316944 | 7/2003 |
| JP | 2004015127 | 1/2004 |
| JP | 2005012781 | 1/2005 |
| JP | 2005-504452 T | 2/2005 |
| JP | 2005050318 | 2/2005 |
| WO | WO 98/53593 | 11/1998 |
| WO | 0007135 | 2/2000 |
| WO | 01/54389 A1 | 7/2001 |
| WO | WO 01/50336 A1 | 7/2001 |
| WO | WO 02/09399 A2 | 1/2002 |
| WO | 02/50717 A2 | 6/2002 |
| WO | WO 02/065741 A2 | 8/2002 |
| WO | 03/061242 | 7/2003 |

OTHER PUBLICATIONS

Ott, Marcus, Conceptual Design and Implementation of a Graphical Workflow-Modeling Editor in the Context of Distribute Groupware-Databases, University of Paderborn, May 1994.*
CenterVu Advocate—Release 9—User Guide Avaya Communications, Dec. 2000.*
Teamware Flow 3.1 User's Guide Teamware Group, Third Edition, Apr. 2000.*
IBM MQSeries Workflow—Concepts and Architecture—Version 3.3 IBM, Fourth Edition, Mar. 2001.*
JetForm's Universally deployable workflow InformationWeek, No. 679, Apr. 27, 1998.*
Steul, D., Redifining the call center: Customer service on the Internet Alcatel telecommunications review, Mar. 2000.*
Brown, Donald E., The Interaction Center Platform—White Paper Interactive Intelligence, Apr. 6, 2001.*
BEA WebLogic Process Integrator—Learning to Use BEA WebLogic Process Integrator BEA, Jul. 2001.*
Seibel eBusiness Applications—Seibel Workflow Administration Guide Seibel 2000, Jun. 2001.*
CentreVu Advocate—Release 9 User Guide Avaya Communication, Dec. 2000.*
van den Broek, Dian, Monitoring and survelliance in call centers: some responses from Australian workers Labor & Industry, vol. 12, No. 3, Apr. 2002.*
Lesaint, David et al., Dynamic Workflow Scheduling for British Telecommunications plc Interfaces, vol. 30, Jan.-Feb. 2000.*
Fukunaga, Alex et al., Staff Scheduling for Inbout Call Centers and Customer Contact Centers Amercian Association for Artificial Intelligence, 2002.*
Oracle Telephony Manager—Impementation Guide—Release 11i Oracle, Nov. 2000.*
Oracle Scripting—Implementation Guide—Release 11i Oracle, Aug. 2000.*
Oracle eMail Center—Impelementation Guide—Release 11i Oracle, Aug. 2000.*
Oracle iSupport—User Guide—Release 11i Oracle, May 2003.*
Oracle Telephone Manager—Concepts and Procedures—Release 11i Oracle, Apr. 2000.*
Oracle Scripting—Concepts and Procedures—Release 11i Oracle, Apr. 2000.*
Telephony@Work, Inc. "CALLCENTER Anywhere, The Complete Contact Center Solution", Administration Manager V.3.0 User Manual, Multi Tenant Version: CR 1998, 1999, 2000.
Tian Jing, "Introduction to routing policy of call center," Editorial Dept. Tianjin Communication Technol, Jun. 2003, No. 2, pp. 33-35 (in Chinese language).
Wisiorowski, "Siemens call center solution-Flex Routing," SIGMA NOT, 1999 vol. 72, No. 2, pp. 108-109 (in Polish language).
Feinberg et al., "Operational determinants of caller satisfaction in the call center," International Journal of Service Industry Management, 2000, vol. 11, No. 2, pp. 131-141.
US Office Action for related copending U.S. Appl. No. 11/376,486; dated Dec. 11, 2009; 11 pages.
US Office Action for related copending U.S. Appl. No. 11/376,486; dated May 25, 2010.
Stohr et al., "Workflow automation overview and research issues", Information Systems Frontiers, Kluwer Dordrechnt, NL, vol. 3, No. 3, Sep. 1, 2001, pp. 281-296, ISSN: 1387-3326.
Belhajjame et al., "A Flexible Workflow model for process oriented applications", proceeding of 2nd International Conference on Web Information Systems Engineering (Kyoto, Japan), vol. 1, Dec. 3, 2001-Dec. 6, 2001, pp. 72-80, XP002588475.
Supplemental Search Report for co-pending European Application No. 067509253.7-1238; mailed on Aug. 19, 2010.
Computer Telephony, RIC Telecom, vol. 7, No. 7, pp. 66-72, published Jun. 20, 2004 (no translation provided).

* cited by examiner

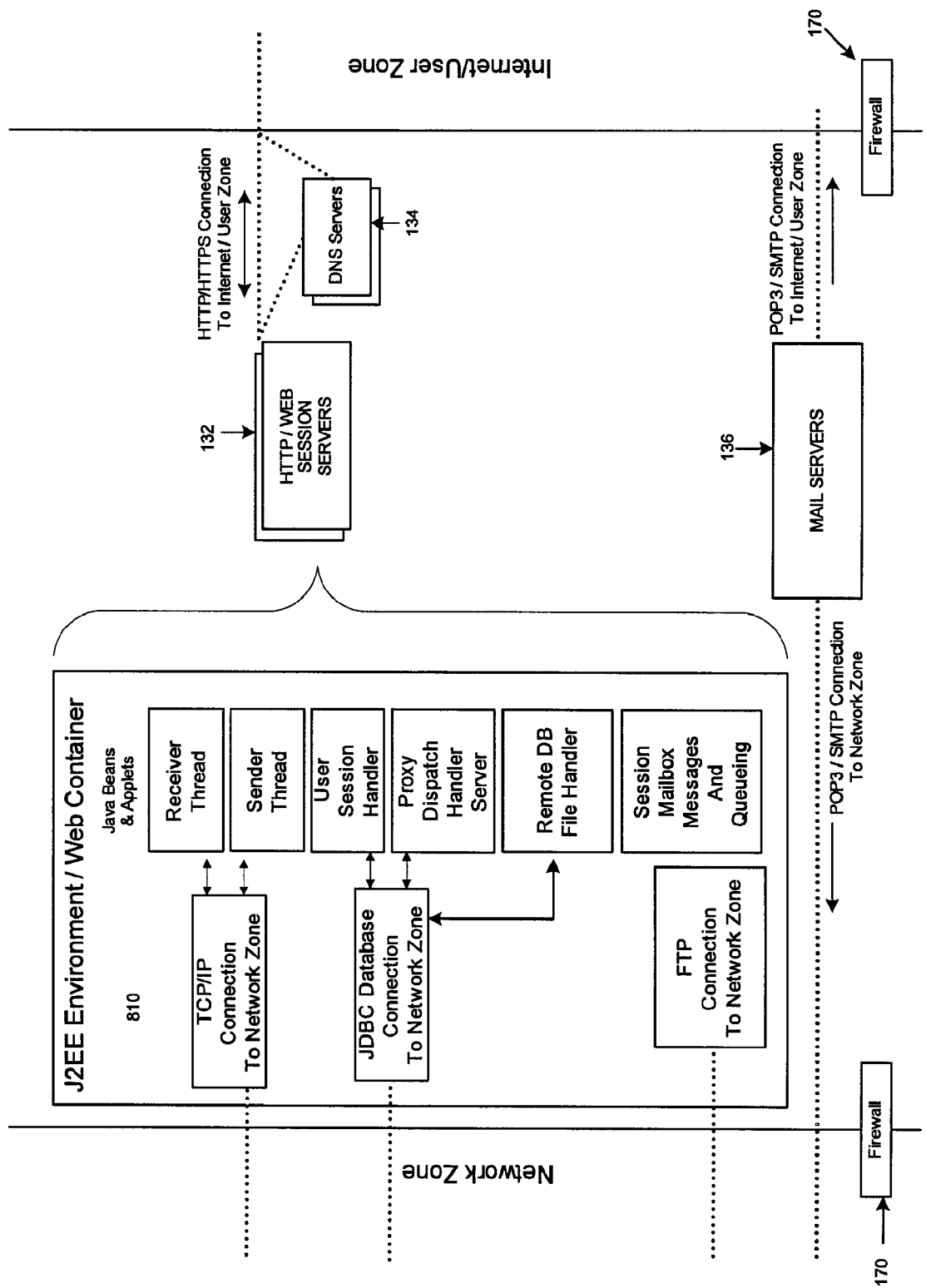

FIG. 13
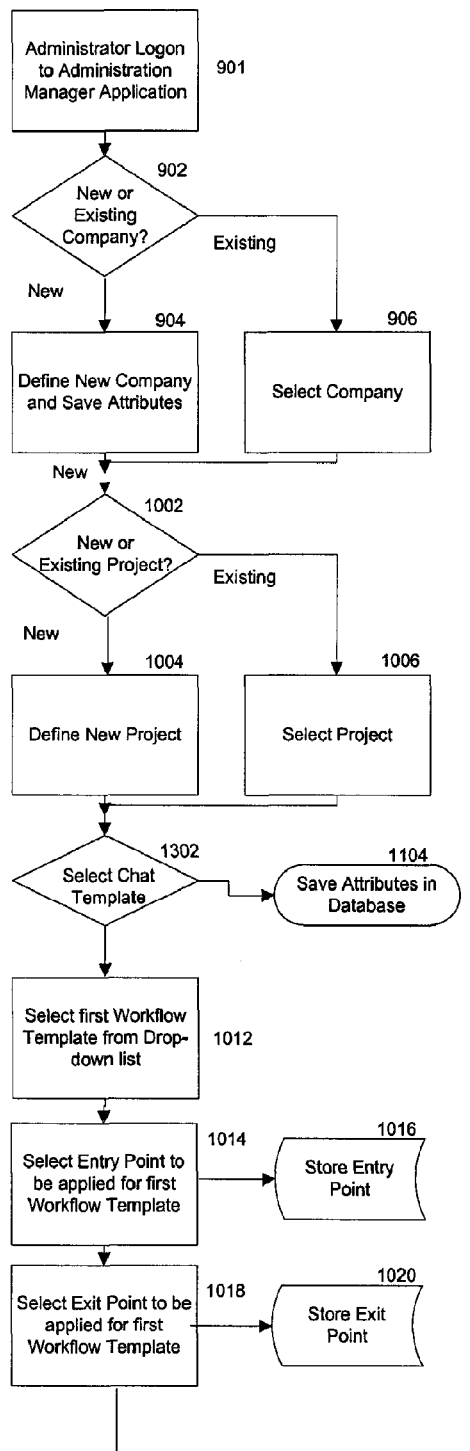
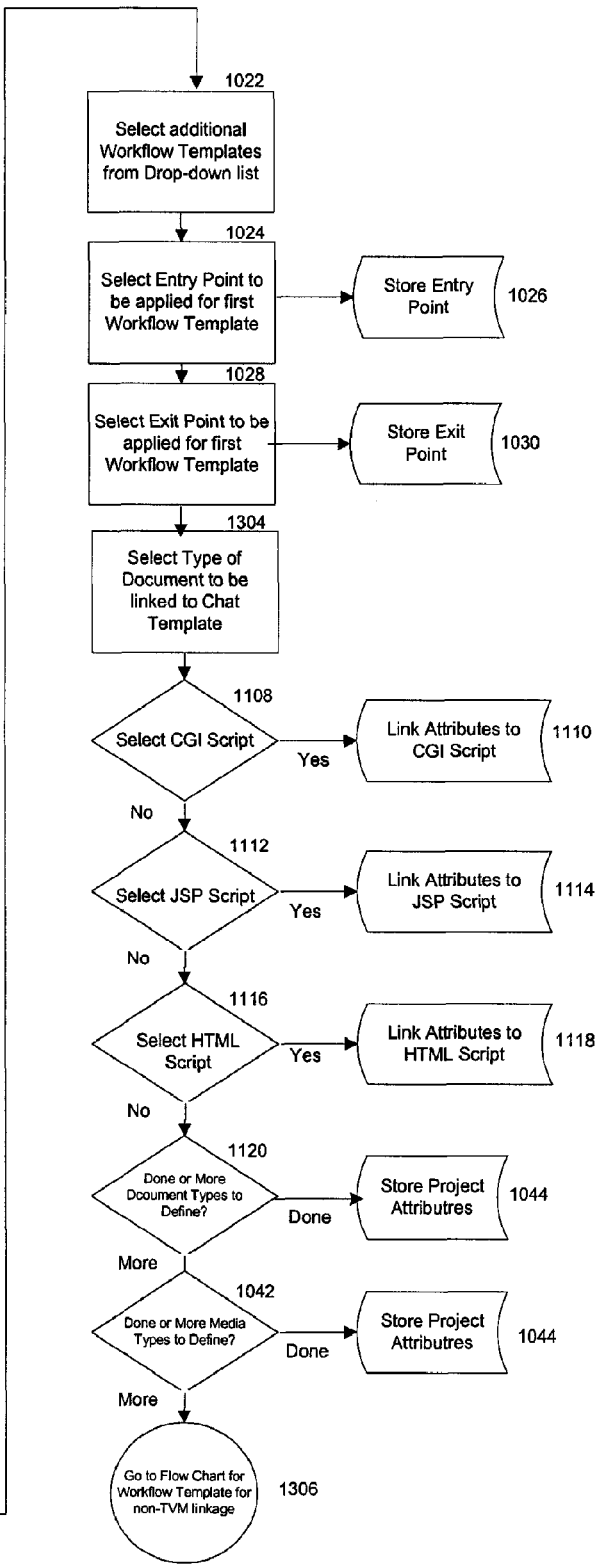

SYSTEM AND METHOD FOR ROUTING WORKFLOW ITEMS BASED ON WORKFLOW TEMPLATES IN A CALL CENTER

CROSS-REFERENCE TO RELATED APPLICATIONS

The present patent application claims priority to U.S. Provisional Patent Application No. 60/706,561, filed Aug. 9, 2005, and entitled "Universal Workflow-Based Routing," the entire disclosure of which is incorporated by reference herein. The present patent application is related to U.S. patent application Ser. No. 11/376,486, filed Mar. 15, 2006, and entitled "Dynamic Customer Satisfaction Routing," the entire disclosure of which is incorporated by reference herein.

BACKGROUND

1. Field of the Invention

The present invention relates to customer service systems and call centers, and more particularly to a customer service and enterprise workflow management method and system that enables, among other things, handling and routing workflow items on a manual, semi-automated, or fully automated basis.

2. Description of Related Art

Workflow items take many forms, but are generally divided into two categories. First, there is the category of Time-Varying Media (TVM), which includes phone calls, e-mails, internet-based chats, voice messages, and other real-time and non-real time media interactions. TVM are workflow items to the extent that they often act as a trigger, or entry point, for subsequent work. Second, there is another broad category of workflow items dealing with the flow of documents or electronic transactions representing non-TVM tasks. These non-TVM items are often called Workflow Documents or Workflow Transactions. For example, these tasks are often associated with activities such as filling out a medical claims form, a loan application, or a trouble ticket.

TVM and Workflow Documents are often managed differently and with a disparate array of hardware and software. For example, TVM-based interactions are generally facilitated with the aid of telecommunications systems such as a Private Branch Exchange (PBX) or an Automatic Call Distributor (ACD), which route telephone calls from a Public Switched Telephone Network (PSTN) or the Internet (e.g., Voice Over IP). In the case of phone calls, these are switched to customer service representatives ("agents") and afforded some value-added intelligence in routing based on pre-determined routing rules based on the caller's phone number and the number dialed. The number callers are calling from is referred to as an Automatic Number Identification (ANI) and the number they are calling is a Dialed Number Identification Service (DNIS). In general, these numbers can be extracted from the phone line in order to make a determination of how the call should be routed based on database look-ups wherein customer information is matched with ANI and DNIS to aid in the disposition of the call. Further to these routing decisions are data dealing with the skills that are possessed by the agents. By matching the skills of an agent coincident with the telephone calls that are coming in to a PBX or ACD, customer service can be enhanced by routing callers to the best-suited or best-skilled agent. This is in addition to the "default" treatment of routing calls simply based on the availability of agents. This skills orientation is referred to as skills-based routing.

Dealing with TVM-based interactions also goes beyond the switching of telephone calls. In addition to telephone calls, the same routing disciplines may be applied to emails sent by customers. The same can also applied to Web-Based Telephone CallBack requests and Web-initiated Chat sessions. In fact, these communications, represented by a plurality of media types can be handled with what's commonly referred to as a multi-channel or multi-media ACD and is described in commonly owned U.S. patent application Ser. No. 09/798,226, entitled "Call Center Administrator Manager," the disclosure of which is incorporated by reference in its entirety.

Likewise, there are commercial systems available for handling non-TVM workflow items such as Electronic Data Interchange (EDI) based forms, eXtensible Markup Language (XML) based documents, proprietary trouble tickets, order fulfillment forms, and a plurality of standard and non-standard order entry and supply chain-oriented tasks and associated documents. For example, the management of these documents and related tasks are offered as part of commonly available Customer Relationship Management (CRM) systems, and Document Imaging systems, and Web Content Management (WCM) systems, and Learning Content Management (LCM) systems.

There are many ways the routing of documents can be automated or semi-automated. As with PBXs and ACDs that handle TVM-based interactions, Workflow Document systems such as those represented by CRM and Document Management industries can be programmed to route documents and other work items to knowledge workers. These knowledge workers may or may not also be characterized as "agents" as the workers associated in answering TVM-based interactions on a PBX or ACD.

While the means to route workflow items (both TVM and Workflow Documents) and tasks can be handled with disparate and dedicated platforms each suited to its particular task, it is nonetheless difficult to make the "life length" of a series of workflow tasks a seamless interaction. The seamlessness and cohesive flow of work items and tasks in any organization is a mark of efficiency. Such efficiency is associated with getting tasks performed easily and quickly. The ease with which these tasks can be completed equates to significant financial benefits for the enterprise. These financial benefits are realized as a result of getting each knowledge worker to produce more work or eliminating the need for more knowledge workers.

Take, for example, the workflow associated with handling a customer request for a loan and further approving that loan and ultimately delivering the item to the customer which was the original motivation for acquiring the loan. The request for the loan may be triggered as a result of a phone call from the customer (likewise that request may be triggered by e-mail, chat, etc.). Certain information may be gathered from the customer as a result of that interaction. The "content" of that interaction may include customer information such as the name, address, household earnings and other items required to start a loan approval procedure.

After the initial call (trigger event) has completed, it is a common practice for the agent to do a "wrap-up" procedure. For example, as a "wrap-up" procedure, the agent who dealt with the phone call may access a separate application, not associated with the PBX or the ACD, in which a form or other document is presented to the agent. The presentation of that form or document is typically managed by a separate application driven by a CRM or Document Management system. That form may be partially filled-out based on the data collected by the agent for further disposition by a supervisor or some other knowledge worker who does not necessarily take phone calls.

Subsequent to the originating call and wrap-up workflow, other work items may be "spawned" as a result. For example, the original document may be routed to a subsequent knowledge worker or supervisor. For example, a credit check with a credit reporting agency may have to occur. This may be triggered automatically based on custom software in a CRM application, or this may be accomplished semi-automatically with the intervention of another knowledge worker. Often, customized routing algorithms will determine the logic flow or passing of the document from one person to another. Software which is entirely separate from the PBX or ACD software may be used to define the skills and/or availability of workers to handle these work items.

Further still, a supervisor may be consulted with or may need to "touch" a document or electronic form in order to authorize the final disposition of the loan. The workflow may continue in the form of sending a fax or letter or email to inform the customer that she has been denied the loan. Or a phone call may ensue to alert the customer of that disposition. On the other hand, the workflow may continue in the form of an acceptance, whereupon subsequent documents and work items are handled to order and ship the item to the customer if his or her loan is approved.

In this simple scenario, a complex workflow has been described. There may also be similar scenarios in which dozens of steps ensue and also involve four or five knowledge workers. However, the skills required or the priority of the customer, or the preferences of the customer, or the availability of the knowledge workers, or the work item preferences of the knowledge workers are not universally known, let alone universally considered in the hand-off off these work items from system to system. Such is the state of integration between TVM-based systems and non-TVM-based systems for managing workflow.

It is clear that there are some common elements in the handling of items associated with TVM and Document-related Workflows. The table below shows the relationships between these items from a workflow management perspective.

| Scenario Example | Time Varying Media | Document-related Work Item |
|---|---|---|
| Type of person involved | Contact center "Agent" | "Agent" or knowledge worker |
| Hardware/Software | ACD, PBX, Email, Chat | Imaging, CRM, Order Entry |
| Workforce Considerations | Agents, Agent Supervisors, Groups | Workers, Supervisors, Groups |
| Skills Consideration | Customer Service, Loans | Approval, Order Entry, Shipping |
| Database Considerations | ANI, Workgroups, Customers. | Documents, Customers, Parts |
| Infrastructure Considerations | Telephones, Computers, LAN, Web | Telephones, Computers, LAN, Web |

This is by no means a comprehensive list, but is shown to accentuate the similarities in complexity and requirements between handling phone calls, emails, chats, etc. (TVM) versus Document-related work items. One way of looking at the difference between these two "worlds" is that TVM are typically customer-facing and document-related, or internal transaction-related work items are often not customer-facing and more related to fulfillment activities or sometimes back office activities. This is not to say that forms and electronic documents are not often used by customers. What's important to consider is that despite the similarities in the need to track workforce skills, customer data, and the routing of interactions and work items, completely disparate systems have been developed to support these activities. Attempts are routinely made to "integrate" these disparate systems, but the architectures and approaches to managing a phone call, let's say, versus routing a medical claims form inside of a healthcare insurance company are completely separate.

This separation between the handling of TVM vs. non-TVM is costly and requires custom, one-off development to link these disparate systems together. An unfortunate outcome of the need to develop custom software to integrate these disparate systems together is an inherently inefficient flow of work. For example, many more "data dips" are often required. Multiple "routing engines" and software are often required for each workflow item. The negative impact, beyond the cost to acquire, program and maintain disparate systems, is a slower response time. These slower response times, as previously mentioned, are costly, but slower response times may also have a negative impact on customer service.

For example, slower response times may be manifest in having to ask the customer more than once to offer information that was not passed from one workflow process to another.

In addition, slower response time may also be manifest in the inefficient routing of subsequent work items to knowledge workers who may not have the requisite skills to efficiently handle the work item. This is often exacerbated owing to the fact that different parts of the workflow are associated with different control systems that may or may not have a skills-based reference point or may or may not have a means to share skills-based data between reference points.

In addition, slower response time may also be manifest in another workforce-related issue dealing with the motivation of each knowledge worker to process the transactions that are linked to their sense of job satisfaction. The is a school of thought generally embraced by contact center managers, for example, that the motivation and satisfaction of contact center agents has a direct and positive correlation to their own sense of satisfaction in completing certain tasks in favor of others. This has necessitated the likes of contests or bonus programs used to cajole the workforce into completing certain tasks in favor of others. For example, a contact center supervisor may offer tickets to a show or a gift certificate to the agent who completes the most number of outbound calls in a certain time period. Much thought and work is put in to creating, promoting and administering such a bonus programs. What is not intuitively obvious to practitioners with average skill in the art is that the development of workflow items and "pools" may be developed that allow workers to either automatically indicate work item preference or dynamically allocate work items based on criteria associated with individual or group preferences.

In addition, slower response time may also be associated with a lack of cohesiveness on the priority of each customer and how that priority is dealt with across disparate systems and databases. For example, a caller may receive priority in the handling of an ACD interaction. But it is not necessarily the case that the workflow items "spawned" from that original transaction will receive the same priority as the priority afforded to the caller in the first place. If all of the workflow items associated with post-wrap-up work go in to the same "bin," then the call treatment on the front-end of the process is a moot point. In short, unless the enterprise can provide a consistent tie-in of priority to the entire life-length of the associated workflow, not only does slower response time have an impact, but this may manifest itself in the overall dissatisfaction of the customer.

SUMMARY OF THE INVENTION

The present invention overcomes the deficiencies in the prior art by providing, among other things: 1) a universal construct for intelligent "ACD-like" routing of all workflow items, regardless of type; 2) a universal construct for applying customer-specific priorities to workflow items, regardless of type; 3) a universal construct for applying workforce-associated skills and related attributes to the routing of workflow items, regardless of type; 4) a universal construct for applying customer satisfaction-associated priorities to the routing of workflow items, regardless of type; 5) a universal construct for applying workforce-initiated preferences, both stored and dynamic, to the routing of workflow items, regardless of type; 6) a universal construct for applying thresholds to the number and type of workflow items already in queue and to use those thresholds as a means to prioritize workflow items in queue; 7) a universal construct for applying thresholds to the number and type of workflow items already being worked on by a specific agent or knowledge worker and to use those thresholds as a means to prioritize workflow items for that worker; and 8) a universal construct for the application of any other attributes which may facilitate the intelligent routing and disposition of any workflow item, regardless of type. The present invention also provides a service creation and administrative environment that allows for the management of the above processes.

In an embodiment of the invention, a method for facilitating a workflow template comprises the steps of: creating a workflow template associated with a workflow item, wherein the workflow template defines one or more trigger points for the workflow item; and linking the workflow template to a project. The one or more trigger points specifies an action to be taken with respect to the workflow item. The step of creating a workflow template may comprise the step of associating a Web page or VXML code to collect input from a party, wherein the party is a call center supervisor, call center customer, or a call center agent. The project can be a phone/IVR project, Web callback project, email project; chat project; or a combination thereof. The step of creating a workflow template may also comprise the step of defining one or more routing rules for the workflow item, which may be based on preference as identified by a supervisor or an agent or knowledge worker. The workflow item may comprise a document. The step of linking can comprise the step of selecting an entry point and exit point to be applied to the workflow template and selecting a CGI, JSP, VXML, XML, EDI, or HTML page/script.

In another embodiment of the invention, a method of workflow-based routing comprises the steps of: executing a workflow template associated with a workflow item and at least one trigger point; and routing the workflow item in response to activation of the trigger point. The method may further comprise the step of generating a user interface in response to activation of the trigger point and/or querying input from a party in response to activation of the trigger point. The trigger point may be a key performance indicator trigger or a trigger for supervisor intervention. The workflow template may be linked to a project dealing with both time varying media and non-time varying media workflow template handling. The workflow template may be associated with a script selected from the group consisting of: XML, EDI, JSP, CGI, VXML, and a combination thereof. The trigger point may also comprise one or more skill-oriented triggers. The step of routing the workflow item may be dependent on an individual work item preferences and may be performed automatically based on an individual work item preference as defined by a supervisor or dependent on the individual work item preference of a specific agent or knowledge worker. The preferences may be arranged and presented to a workforce as a pick list allowing for selection of preferred work items.

In yet another embodiment of the invention, a workflow document rendering method comprises the steps of: storing a workflow template, and storing database pointer information to render the workflow template. The method may further comprise the step of associating one or more media types with the workflow template.

In yet another embodiment of the invention, a system comprises: a multi-media automatic call distributor for facilitating an interaction, and a server for routing a document associated with the interaction.

In an embodiment of the invention, one or more Workflow Templates and corresponding workflow attributes and trigger points are created. Such Workflow Templates are used to link to a customer priority or event-driven weighting mechanism for each workflow item or link to key performance indicator (KPI) specific triggers. These Workflow Templates are used to generate user interface views which will be used by agents, knowledge workers, supervisors and customers.

One advantage of the present invention is that it provides a universal construct for the intelligent routing of workflow items, thereby improving efficiency and decreasing costs.

Another advantage of the present invention is that it provides a method for defining and establishing a customer prioritization associated with a workflow item during the life-length of workflow item, thereby improving aspects of overall customer satisfaction.

Yet another advantage of the present invention is that it facilitates various media types (TVM and non-TVM) thereby providing a single platform for handling a multitude of incoming workflow items resulting in improved workflow efficiency and response time.

The foregoing, and other features and advantages of the invention, will be apparent from the following, more particular description of the embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which:

FIG. 8 illustrates a detail view of the Web/DMZ zone of the network shown in FIG. 1;

FIG. 13 illustrates a process of linking Workflow Templates to Chat Projects according to the embodiment of the invention;

DETAILED DESCRIPTION OF THE EMBODIMENTS

Embodiments of the present invention and their advantages may be understood by referring to FIGS. 1-18 and are described in the context of a robust workflow routing environment. Nonetheless, the improvements described herein are applicable to any type of environment where there is a need to facilitate routing workflow items (both TVM and Workflow Documents).

Figure 1:
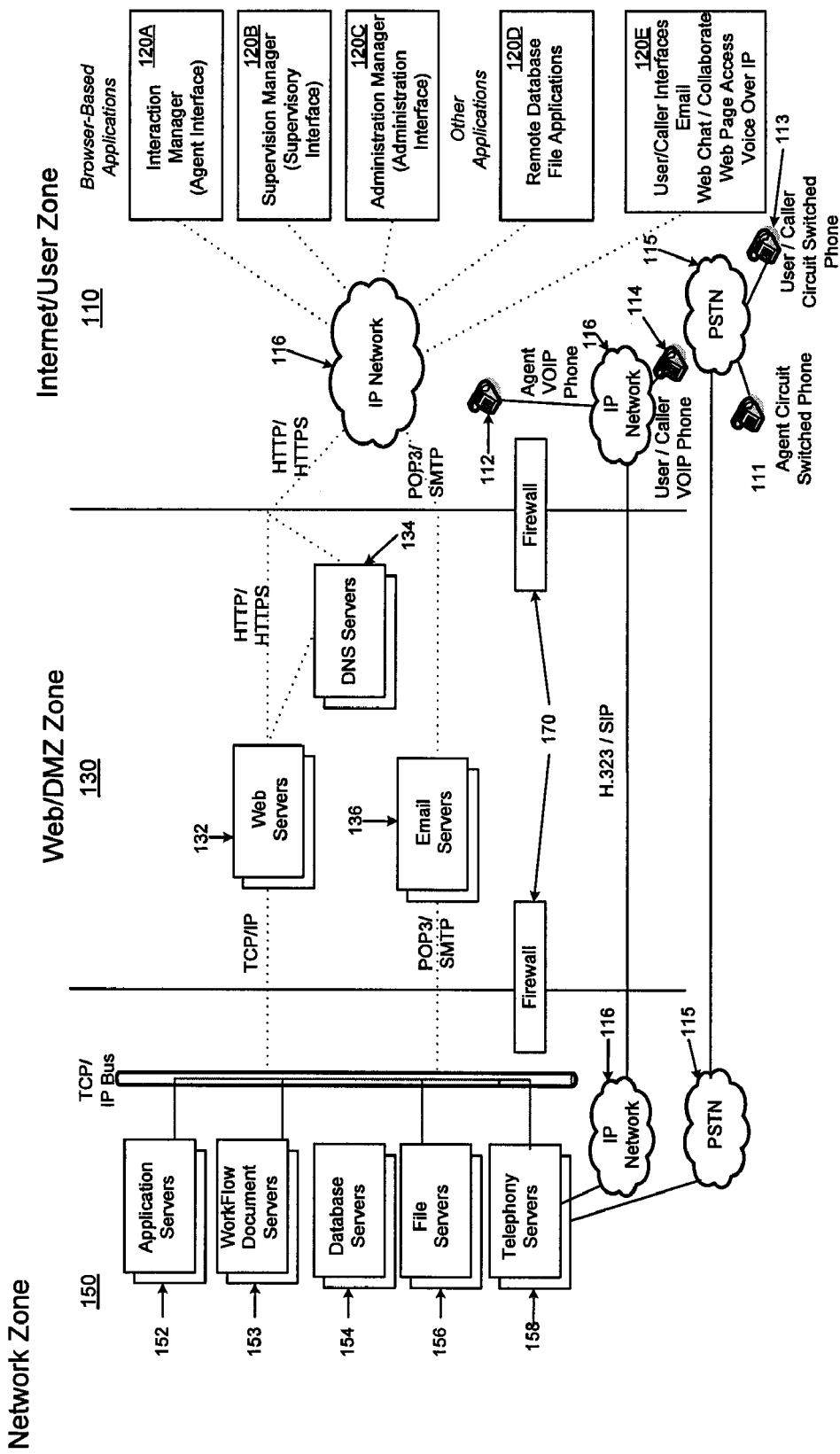
FIG. 1 illustrates a top level view of a dynamic universal workflow-based routing network according to an embodiment of the invention.

FIG. 1 illustrates a top level view of a workflow-based routing network 100 according to an embodiment of the invention. In sum, the network 100 facilitates the manual, automatic, and semi-automatic treatment of workflow items can be created.

In order to better understand the present invention, the network 100 is described as comprising three separate "zones," which together facilitate a workflow environment. These "zones" may be divided in a variety of ways and the exemplary embodiment shown in no way limits one of ordinary skill in the art from implementing the invention in another configuration. The three zones are referred to as an "Internet/User Zone" 110, a "Web/DMZ Zone" 130, and a "Network Zone" 150. It is important to note that these "zones" may be divided in a variety of ways and the illustrative embodiment in no way limits one of ordinary skill in the art from implementing the invention in another configuration.

The Internet/User Zone 110 comprises multiple interfaces 120A-E for call center agents, supervisors, and other authorized parties to access the network 100 and use telephone instruments 111 and 112 via a PSTN or an Internet Protocol (IP) network 166, and/or computers (not shown) to access database-driven information associated with customers, e.g., caller information history. It is not a prerequisite that agents have access to caller information history for the invention to be useful, but it is helpful for agents to have access to such. The Internet/User Zone 110 also implements access software for administrators to create Workflow Templates and Trusted Application linkages which will provide the routing instructions, triggers and other rules for the subsequent routing of workflow items as noted below. The Internet/User Zone 10 further implements access software that allows Supervisors to provide monitoring and coaching of both contact center agents and knowledge workers. Supervisors can also score agent and knowledge worker transactions and other workflow items in real time. Supervisors can also score agent and knowledge worker transactions and other workflow items off-line using templates that were created by the aforementioned administrator as described in U.S. patent application Ser. No. 11/376,486, filed Mar. 15, 2006, and entitled "Dynamic Customer Satisfaction Routing." The Internet/User Zone 110 further comprises telephone instruments 113 and 114, computers (not shown) and/or other access terminals (not shown), wherein customers are able to access the network 100 in order to interact and/or "self navigate" through information stores, e.g., websites, and questionnaires, i.e., surveys, and also be able to interact with agents, knowledge workers and supervisors. Such interactions include, but are not limited to, telephone calls including VoIP calls, Web-initiated chats, email, and web callbacks. Users may also interact in other ways associated with workflows that would be subsequently handled by the enterprise. This may include, for example, the filling out of electronic forms or other documents which would then be routed by an ACD application that is part of the network. Telephone calls can be sent to other parts of the network 100 over, for example, a PSTN 115; a cellular network (not shown); a computer network 116 such as an IP network, the Internet, or a private computer network; the implementation of or connection to which are apparent to one of ordinary skill in the art. Computer-based interactions may be facilitated via protocols such as, but not limited to HyperText Transport Protocol (HTTP), Secure HyperText Transport Protocol (HTTPs), as well as Post Office Protocol 3 (POP3) and Simple Mail Transport Protocol (SMTP) for email communications, the implementation of which are also apparent to one of ordinary skill in the art.

Exemplary interfaces 120A-E include an Interaction Manager 120A, a Supervision Manager 120B, and an Administration Manager 120C. The Interaction Manager 120A, the Supervisor Manager 120B, and the Administration Manager 120C provide interfaces for the agent, a supervisor or the like, and an administrator, respectively, to interact with the network 100. In one embodiment of the invention, the interfaces 120A-C are browser-based applications. Interfaces 120D and 120E are further included to facilitate communication with respective database servers and user/callers opting to contact the call center via email, web chat, VoIP, web page forms, or other communication techniques facilitated through the IP network 116.

In an embodiment of the invention, the Web/DMZ Zone 130 comprises any combination of Web Servers 132, Domain Name Servers 134, and Email Servers 136 and other components to provide secure access and transport services for computer-based interactions such as Web-initiated chat requests, Web-initiated Call-back requests between customers and agents, between customers and supervisors, and between supervisors and agents. The Web/DMZ Zone 130 also provides a transport layer for administration, agent and supervisor screens such that agents, supervisors and administrators have secure access to databases containing customer information, contact center configuration, routing rules, key-performance indicator (KPI) templates and real-time information for the handling of interactions (real time and non-real time interactions). In at least one embodiment of the invention, the Web Servers 132 interact with a customer's computer, an agent's computer, a supervisor's computer, an administrator's computer, or a combination thereof, and associated software over HTTP or HTTPs as particularly shown in FIG. 8, which is described below. The Web Servers 132 may optionally store and transfer messages that are passed to and from the Network Zone 150, where the messaging between those elements is implemented by Transport Control Protocol/Internet Protocol (TCP/IP). Therefore, the Web Servers 132 in the Web/DMZ Zone 130 also act as translators between HTTP or HTTPS and TCP/IP. This translation capability is in place to provide easy and universal access to the interfaces 120A-E or other thin client applications in use by the agents, supervisors, administrators, and/or customers.

In an embodiment of the invention, the Network Zone 150 comprises one or more application servers 152, one or more workflow document servers 153, one or more database servers 154, one or more file servers 156, and one or more telephony servers 158. These software-based servers are located in host computers connected to a TCP/IP bus 160, which is in turn connected to the email servers 136 and web servers 132 in the Web/DMZ zone 130.

Application servers 152 implement software that controls the flow of phone calls, e-mails, chats, and web call-back requests between customers and agents, and supervisors. The workflow document servers 153 act as specialized file servers and store information including, but not limited to, Workflow Templates and media files associated with Workflow Templates. In addition, the workflow document servers 153 may contain database pointer information, so information stored in the database servers 154 can be used to render Workflow Templates and other user-facing data associated with Workflow Templates. The database servers 154 store information such as, but not limited to Workflow Template data, customer records, interaction history, application parameters, agent location data, agent skill data and information which links key performance indicators (KPIs) and customer satisfaction data to the treatment and priority of customer interactions. The file servers 156 in the network zone 150 are used to store media such as agent recordings, KPI templates, scripts, voice messages, chat transcripts and e-mail transcripts. The telephony servers 158, the implementation of which is apparent to one of ordinary skill in the art, offer control over the physical switching of phone calls whether they are "soft switch" phone calls used with Voice over IP gateways or PSTN-switched phone calls over switching cards housed in personal computers (PCs). For example, a telephony server 158 may facilitate Internet telephony implementing a signaling protocol, such as a Session Initiated Protocol (SIP), to establish, for example, an audio/videoconferencing session over the IP network 116. Alternatively, sessions facilitated by a telephony server 158 may implement H.323, which is a standard approved by the International Telecommunication Union (ITU) that defines how audiovisual conferencing data is transmitted across networks. H.323 enables users to participate in the same conference even though they are using different videoconferencing applications.

Figure 2:
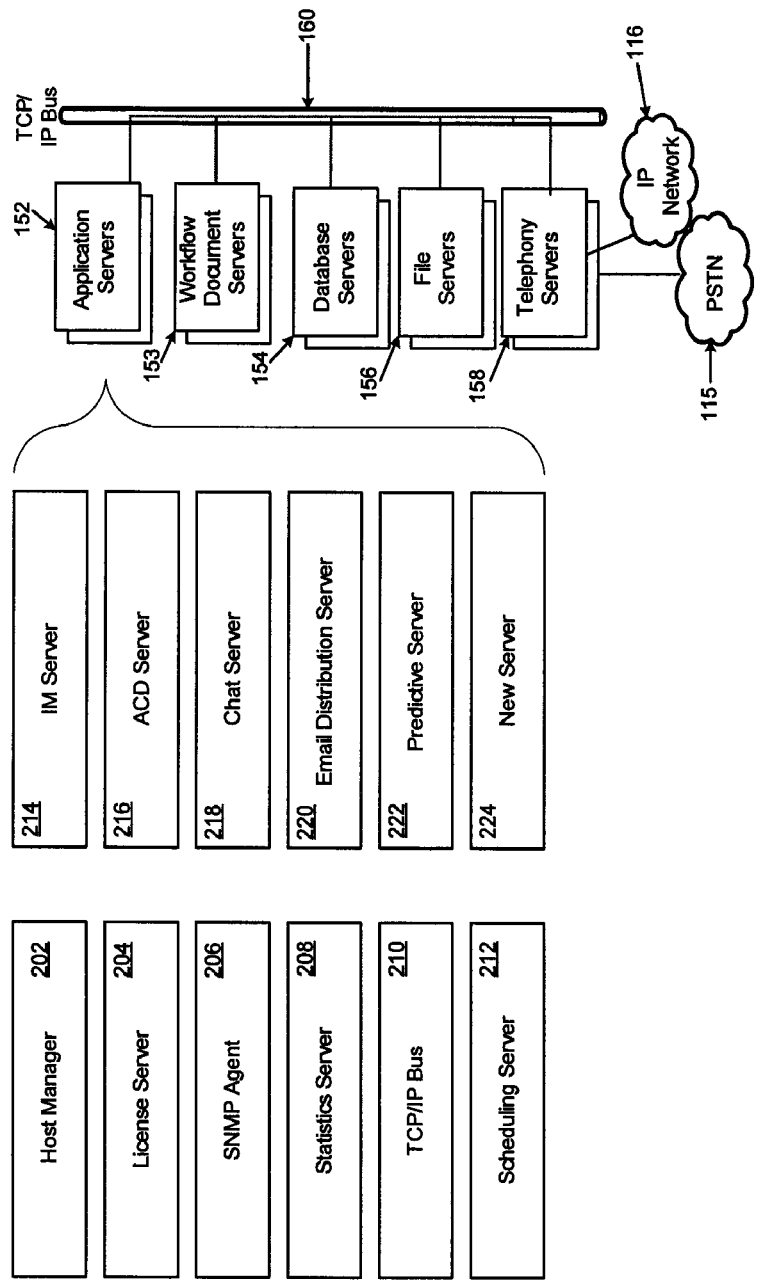
FIG. 2 illustrates application servers within a network zone of the network shown in FIG. 1.

FIG. 2 illustrates exemplary applications of an application server 152 within the network zone 150 of the network 100 according to an embodiment of the invention. For instance, the application server 152 comprises a host manager 202, a license server 204, a SNMP agent 206, a statistics server 208, a TCP/IP bus 210, a scheduling server 212, an IM server 214, an ACD server 216, a chat server 218, an email distribution server 220, predictive server 222 and a placeholder for any new or later added server, 224. These applications are described in greater detail in commonly-owned U.S. Pat. No. 6,697,858, entitled "Call Centers for Providing Customer Services in Telecommunications Network," and U.S. patent application Ser. No. 09/902,069, entitled "Call Center Administration Manager with Rules-Based Routing Prioritization," the entire disclosures of which are incorporated by reference herein. Such a combination of applications is exemplary only and does not preclude any other configuration based on, for example, any subset of these components.

Although not the primary focus of the invention, each application in FIG. 2 is briefly described to better understand it role in the overall network 100. Particularly, the host manager 202 provides a mechanism for file transfer protocol (FTP) to other application servers and as a proxy to a network manager and manages communications with client machines (e.g., of the customers and/or agents and supervisors) interacting with the server 152. For example, the host manager 202 manages FTP sessions with the server 152. The license server 204 facilitates registration of the client machines and governs legal use of licenses. The simple network management protocol (SNMP) 206 agent manages SNMP-compliant devices within the network 100 by sending messages, called protocol data units (PDUs), to the SNMP-compliant devices, which store data about themselves and return this data to the SNMP requesters. The statistics server 208 transmits statistics interaction histories to and from the databases 154. The TCP/IP bus 210 facilitates the transmission of data over a TCP/IP network. The scheduling server 212 schedules certain events such as, but not limited to call menus for after business hours. The IM server 214 is an application that acts as a bridge between the Network zone 150 and the client applications. The automatic call distributor (ACD) server 216 stores agent skill information. In an embodiment of the invention, the handling instructions are based on one or more key performance templates as described below. The chat server 218 facilitates chat sessions with customers over, for example, the Internet. The email distribution server 220 facilitates and manages email communications among customers, agents, and supervisors. The predictive server 222 manages and assists automatic outbound call dialing for agents and/or supervisors.

Figure 3:
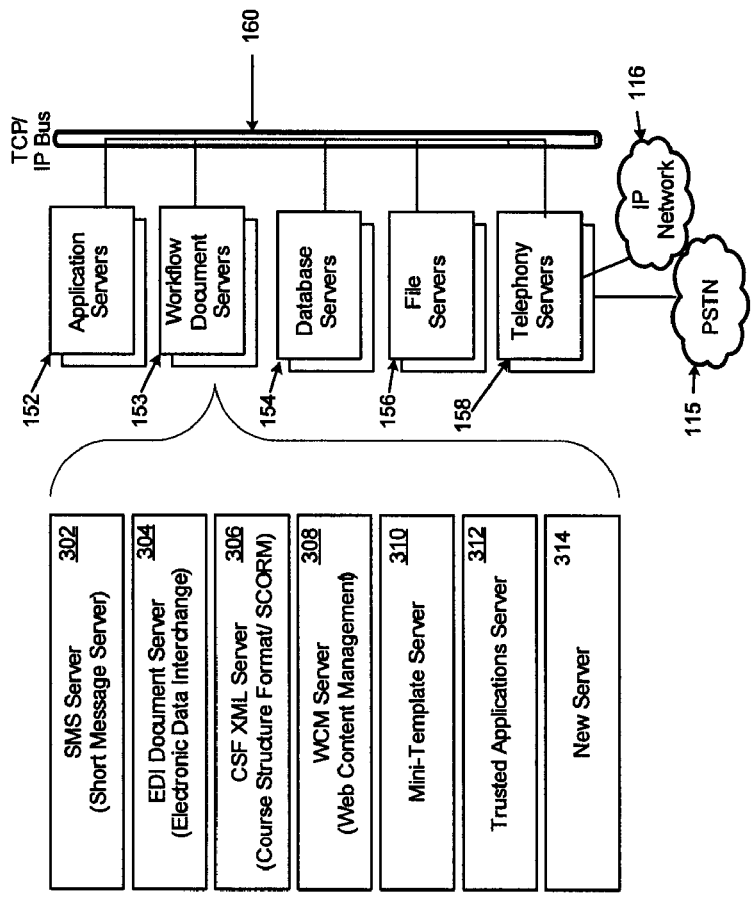
FIG. 3 illustrates workflow document servers within a network zone of the network shown in FIG. 1.

FIG. 3 illustrates exemplary applications of a workflow document server 153 within the network zone 150 of the network 100 according to an embodiment of the invention. For instance, the workflow document server 153 comprises a Short Message Service (SMS) Server 302, an EDI document server 304, a Communication Services Framework (CSF) XML server 306, a Web Content Management (WCM) server 308, a Template server 310, a Trusted Application server 312, and a new server 314, which is a placeholder for any new or later added server.

Figure 4:
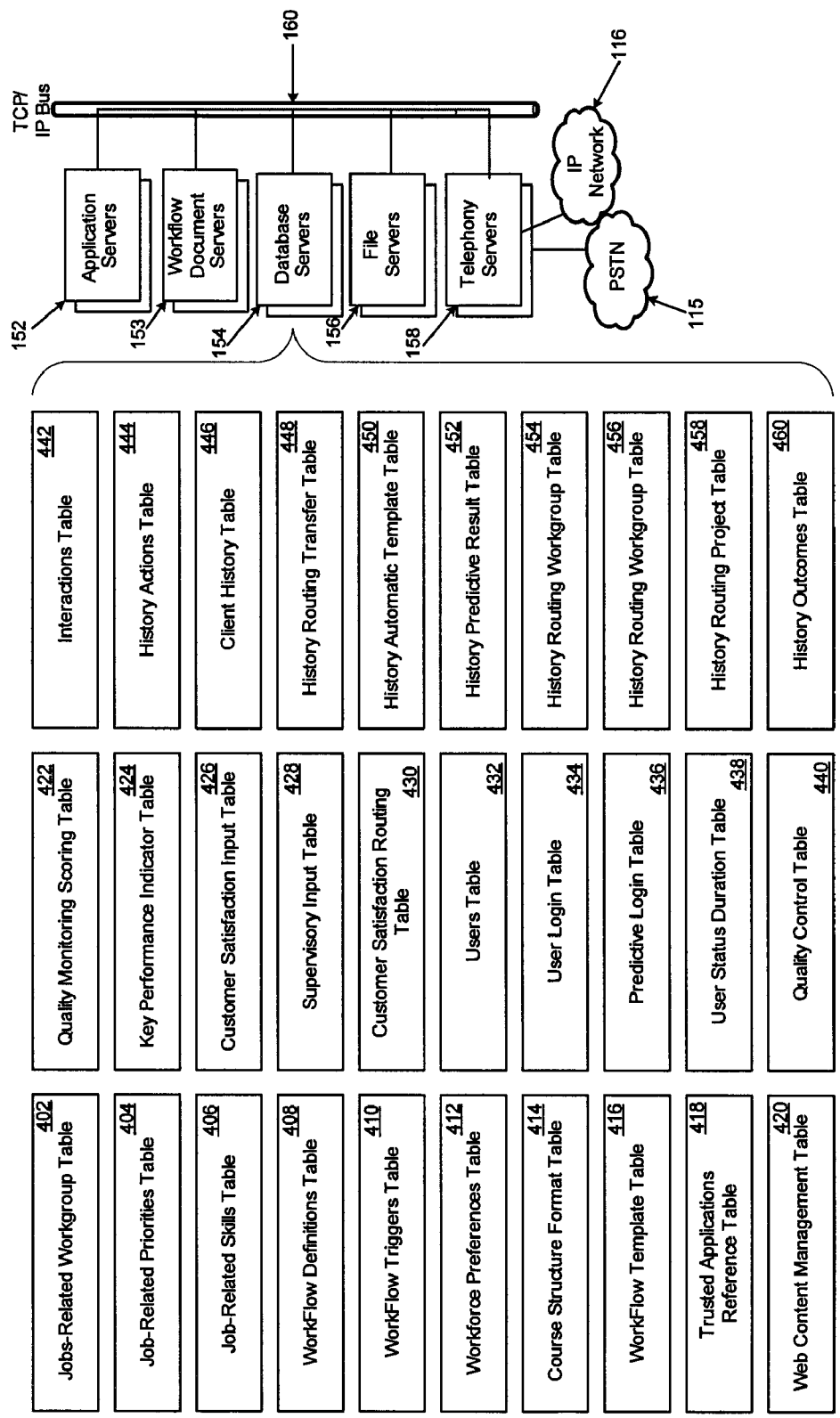
FIG. 4 illustrates database servers within a network zone of the network shown in FIG. 1.

FIG. 4 illustrates exemplary tables configured within the database server 154 according to an embodiment of the invention. These exemplary tables include, but are not limited to a Jobs-Related Workgroup table 402, Jobs-Related Priorities table 404, a Jobs-Related Skills table 406, and a Work Flow Definitions table 408. These tables 402-460 store information to facilitate the KPIs, KPI templates, and dynamic routing of customer interactions with the network 100 discussed herein.

The database server 154 further includes a Work Flow Trigger table 410, a Workforce Preference table 412, a Course Structure Format table 414, a Work Flow Template table 416, a Trusted Application Reference table 418, a Web Control Management table 420, a Quality Monitoring Scoring table 422, a Key Performance Indicator table 424, a Customer Satisfaction Input table 426, a Supervisory Input table 428, a Customer Satisfaction Routing table 430, a User table 432, a User Login table 434, a Predictive Login table 436, a User Status Duration table 438, a Quality Control table 440, an Interaction table 442, a History Action table 444, a Client History table 446, a History Routing Transfer table 448, a History Automatic Template table 450, a History Predictive Result table 452, a History Routing Workgroup tables 454-456, a History Routing Project table 458, and a History Outcomes table 460, the implementation of all of which are apparent to one of ordinary skill in the art. Such a configuration of tables is exemplary only and does not preclude any other configuration based on, for example, any subset of these components.

In general, tables 402-460 store three different types of data: (1) information about the workforce, for example, agent skills and profiles, designated workgroups, and identification of supervisors; (2) business rules, for example, routing of customer inquiries and timing of events; and (3) historical information.

Figure 5:
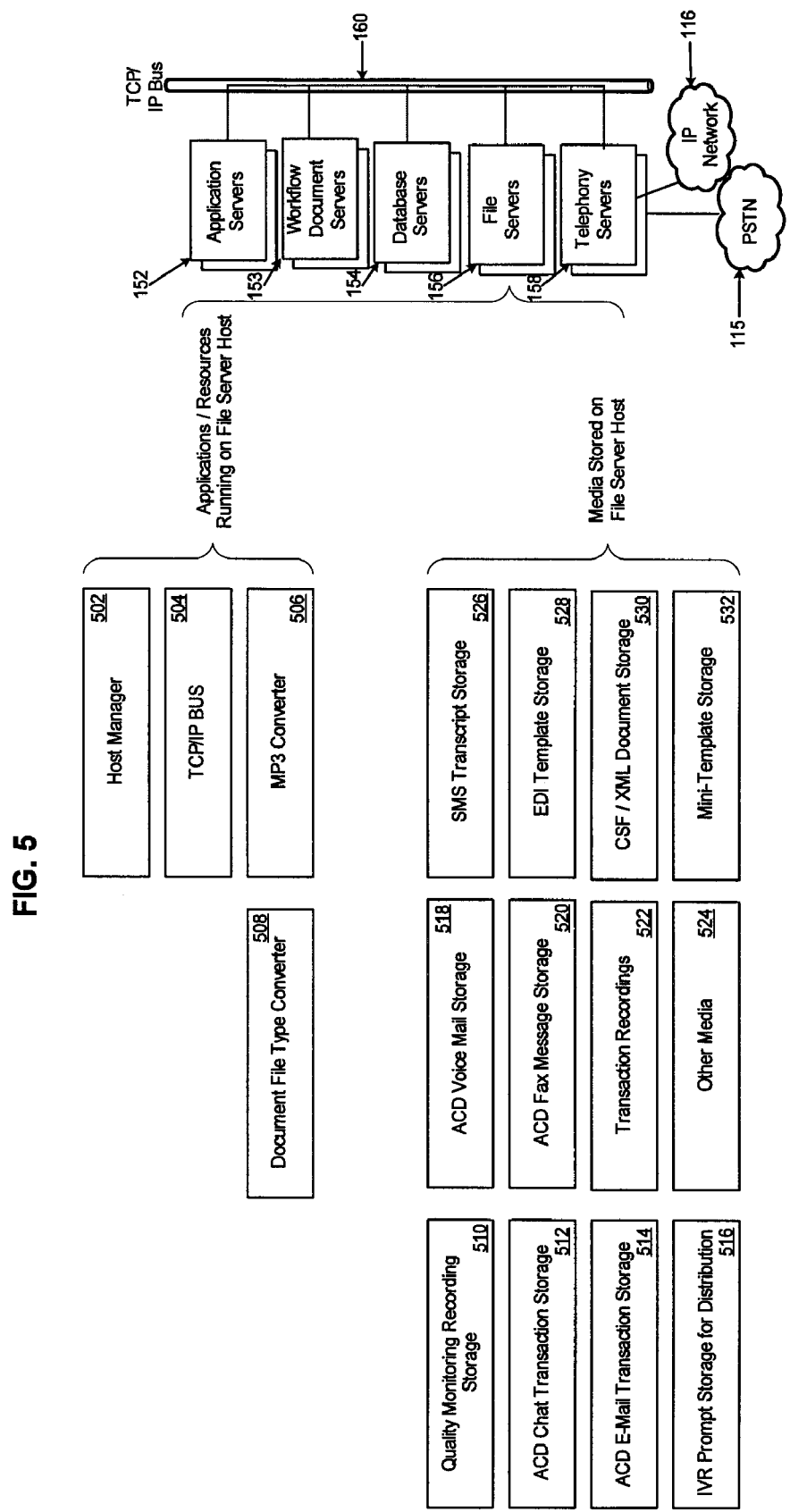
FIG. 5 illustrates file servers within a network zone of the network shown in FIG. 1.

FIG. 5 illustrates exemplary components of a file server 156 within the network zone 150 of the network 100 according to an embodiment of the invention. In general, the components can be differentiated between applications and resources running on the file server 156, and media stored on the file server 156. For instance, in an embodiment of the invention, the file server 156 includes applications: host manager 502, TCP/IP bus 504, a MPEG audio layer-3 (MP3) converter 506, and a document file type converter 508, the implementation of all of which are apparent to one of ordinary skill in the art. The MP3 converter 506 is provided for storing audio into a relatively small and manageable digital file sizes. Nonetheless, alternative audio encoding schemes to MP3 may be implemented.

The file server 156 further comprises storage for different types of media. Particularly, the file server 156 comprises a quality monitoring recording storage 510, an ACD chat transaction storage 512, an ACD email transaction storage 514, an IVR prompt storage 516, an ACD voice mail storage 518, an ACD fax message storage 520, a transaction recordings storage 522, other media storage 524, an SMS transcript storage 526, an EDI template storage 528, a CSF/XML document storage 530, and a template storage 532.

Figure 6:
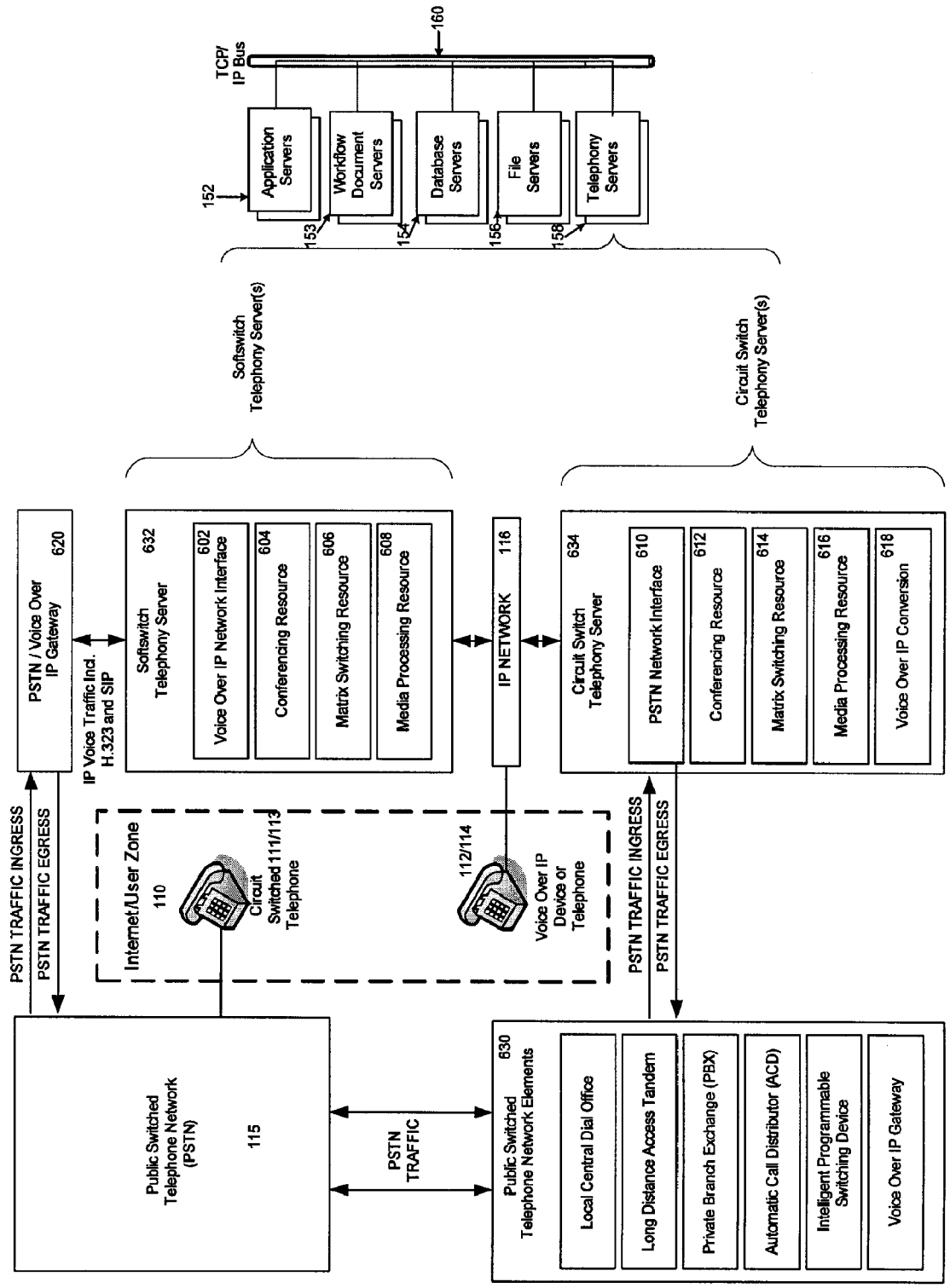
FIG. 6 illustrates a switching view of telephony servers within a network zone of the network shown in FIG. 1.

FIG. 6 illustrates an application view of telephony servers 158 within the network zone 150 of the network 100 according to an embodiment of the invention. Particularly, a plurality of applications/resources running on a telephony server 158 include, but are not limited to: a PSTN/VOIP gateway 620, a softswitch telephony server 652, an IP network 116, a circuit switch telephony server 634, a PSTN 115, and a public switched telephone network elements 630. Communication links are established between the PSTN 115 and the IP network 116 via the Internet User Zone 110 comprising of the circuit switched telephone 111/113 and the VOIP device/telephone 112/114. Additionally, the flow of PSTN two way traffic exists between the PSTN 115 and Public Switch 630, the Public Switch 630 and Circuit Switch 634, and the PSTN 115 and VOIP Gateway 620. IP traffic links are established between the VOIP Gateway 620 and the Softswitch 652, the Softswitch 652 and the IP Network 116, and the IP Network 116 and the Circuit Switch 634.

Each server and network in FIG. 6 are further comprised of additional resources. For example, resources that make up the softswitch server 652 are comprised of the VOIP network interface 602, the conferencing resource 604, the matrix switching resource 606, and the media processing resource 608. Subsequently, available resources for the circuit switch 634 include the PSTN network interface 610, the conferencing resource 612, the matrix switching resource 614, the media processing resource 616, and the VOIP conversion 618. Finally, resources available for the public switched telephone network 630 include the local central dial office 619, the long distance access tandem 621, the private branch exchange (PBX) 622, the automatic call distributor (ACD) 623, the intelligent programmable switching device 624 and the VOIP gateway 625. Such resource configuration is exemplary only and does not preclude any other configuration based on, for example, any subset of these resources.

Figure 7:
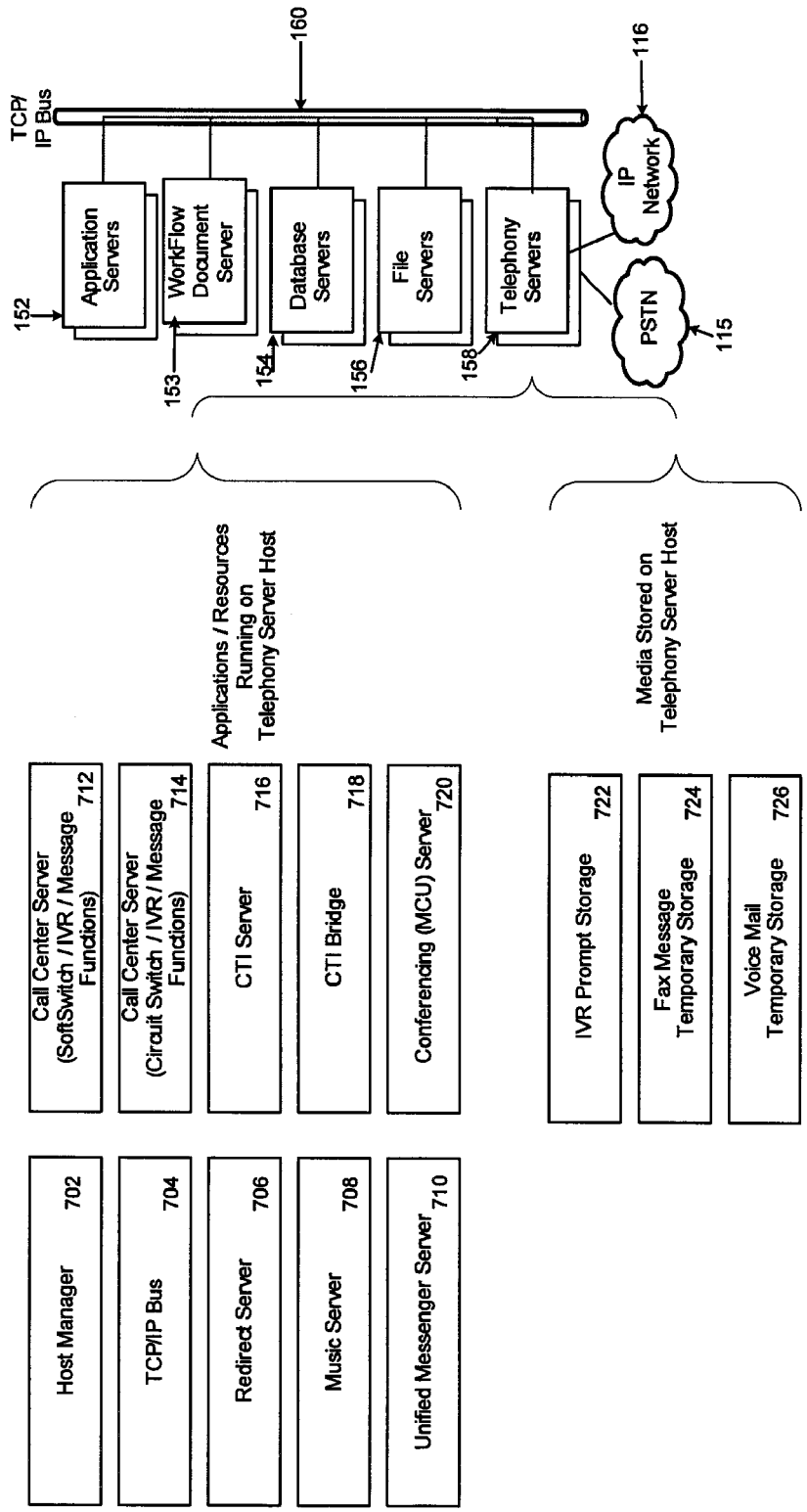
FIG. 7 illustrates a application view of telephony servers within a network zone of the network shown in FIG. 1.

FIG. 7 illustrates a application and storage view of telephony servers 158 within a network zone 150 of the network 100 according to an embodiment of the invention. Particularly, applications and resources running within the telephony server 158 are comprised of the host manager 702, the TCP/IP bus 704, the redirect server 706, the music server 708, the unified messenger server 710, the call center servers 712/714, the Computer-Telephony-Integration (CTI) server 716, the CTI bridge 718 and the conferencing (MCU) server 720. The storage of media stored on the telephony server 158 includes the IVR prompt storage 722, the fax message temporary storage 724, and the voice mail storage 726.

FIG. 8 illustrates a detail view of the Web/DMZ zone 130 of the network 100 according to an embodiment of the invention. Here, the HTTP/Web servers 132 comprise a standard Java 2 Platform, Enterprise Edition (J2EE)/Web container 810, the implementation of which is apparent to one of ordinary skill in the art.

Figure 18:
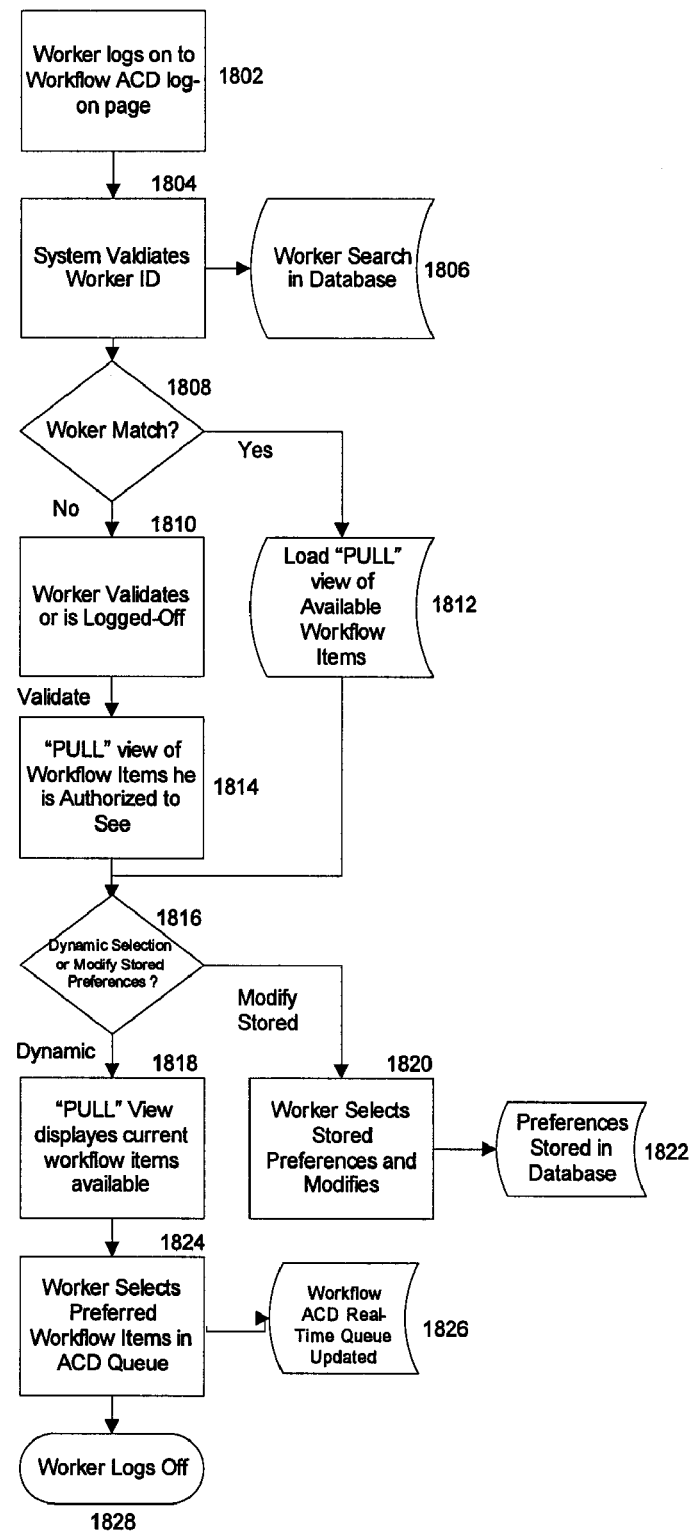
FIG. 18 illustrates a process of Worker-Initiated Preferences of Workflow items according to the embodiment of the invention.

As previously noted, the present invention facilitates the creation of Workflow Templates in a database 153 and also the designation of linkage between these templates and specific projects dealing with different media type handling. Workflow Templates are used to automatically generate user interface views which will be used by agents, knowledge workers, supervisors and customers. Likewise, Workflow Templates may trigger views associated with Trusted Applications. These trusted applications may be supplied by $3^{rd}$ parties who use an API (Application Programming Interface), such as the Web Services API supplied by Telephony@Work, so electronic forms and other documents supplied by a third party can populate an agent, knowledge worker, supervisor or customers' computer screen. Such Workflow Templates provide the means to create, define and store the name and definition of and "trigger points" for each workflow item. Further, each template can be used to reference a weighting mechanism (importance level) for each workflow item. Further, each workflow item template can be used to link to KPI-specific triggers, such as routing triggers or triggers for supervisor intervention. Further, each workflow item template can be used to link to a customer priority weighting mechanism (importance level) for each workflow item. In addition, each workflow item template can be used to link to an event-driven weighting mechanism (importance level) for each workflow item having to do with the thresholds or "business" of various workflows. For example, the routing of a workflow item can be made dependent on the number of other work items already in queue for that item or associated items. Or the routing of a workflow item can be made dependent on the type and number of other work items being handled by a particular agent or knowledge worker. Furthermore, the routing of a workflow item can be made dependent on the skill level of a particular agent or knowledge worker or the skill requirements of different workgroups. Moreover, the routing of a workflow item can be made dependent on the stored or dynamic workflow item preferences of a particular agent or knowledge worker or the workflow item preferences, as illustrated in FIG. 18, of different workgroups. The Administration Manager interface is used to define the attributes and trigger points referenced here for Workflow Templates and trusted applications.

Triggers are actions based on pre-set parameters that occur as a result of certain events or thresholds being accomplished. Triggers may act as "entry points" or "next step" instructions for workflow. For example, TVM events can act as triggers because they often signal the passage of a certain event that then causes a next event in the workflow to occur. For example, the request for the loan may be triggered as a result of a phone call from the customer (likewise that request may be triggered by e-mail, chat, etc.). So the phone call coming in on a certain number or called from a certain number can be the basis for a trigger. After the initial call (trigger event) has completed, the agent might do a "wrap-up" procedure. So when the caller hangs up, that can be characterized as a "trigger event" that causes the wrap-up part of the workflow to ensue. Subsequent to the originating call and wrap-up workflow, other work items may be "spawned" as a result. So the wrap-up being completed may trigger a fulfillment activity and so on. Skills, workgroup requirements such as service levels, customer priorities, and workforce preferences may also be used as triggers. In short, any piece of data or workflow event that can be characterized and parameterized in the database can essentially be used as a trigger.

Workflow Templates can be created as the basis for a workflow item that agents or knowledge workers or supervisors use. In addition, Workflow Templates can be created to be used by customers. The trigger points for when a document is used by a knowledge worker, let's say, versus a customer, are also determined when creating the template. Further, in creating a Workflow Templates the administrator can instruct the system to save scripts associated with the template that can be saved as XML, EDI, JSP, CGI, VXML, etc. so as to be able to automatically generate documents or logic flows consistent with the target media type for the anticipated interactions with customers.

Figure 9A:
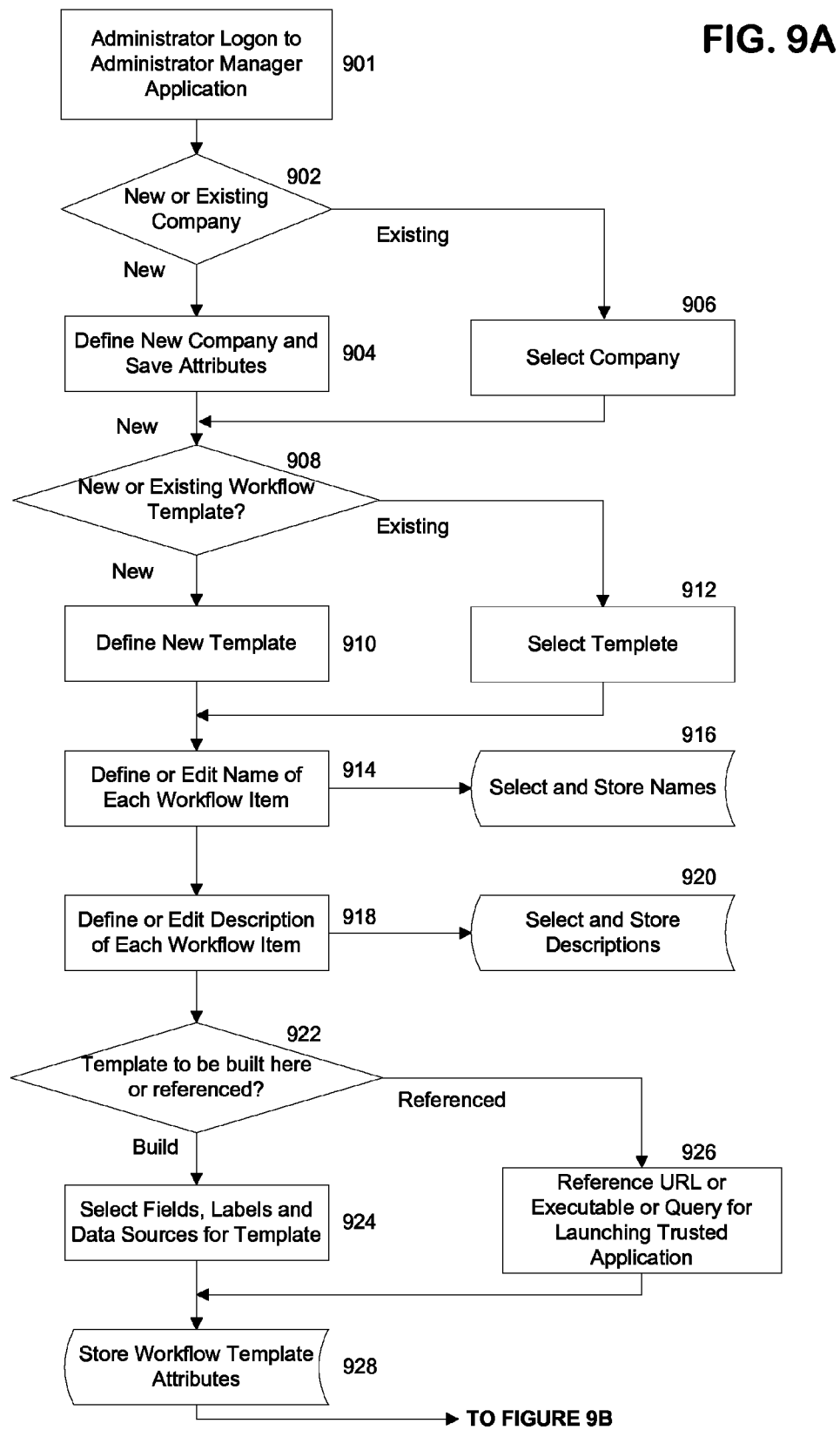
FIGS. 9A-C illustrate a process of creating a Workflow Templates according to the embodiment of the invention.
Figure 9B:
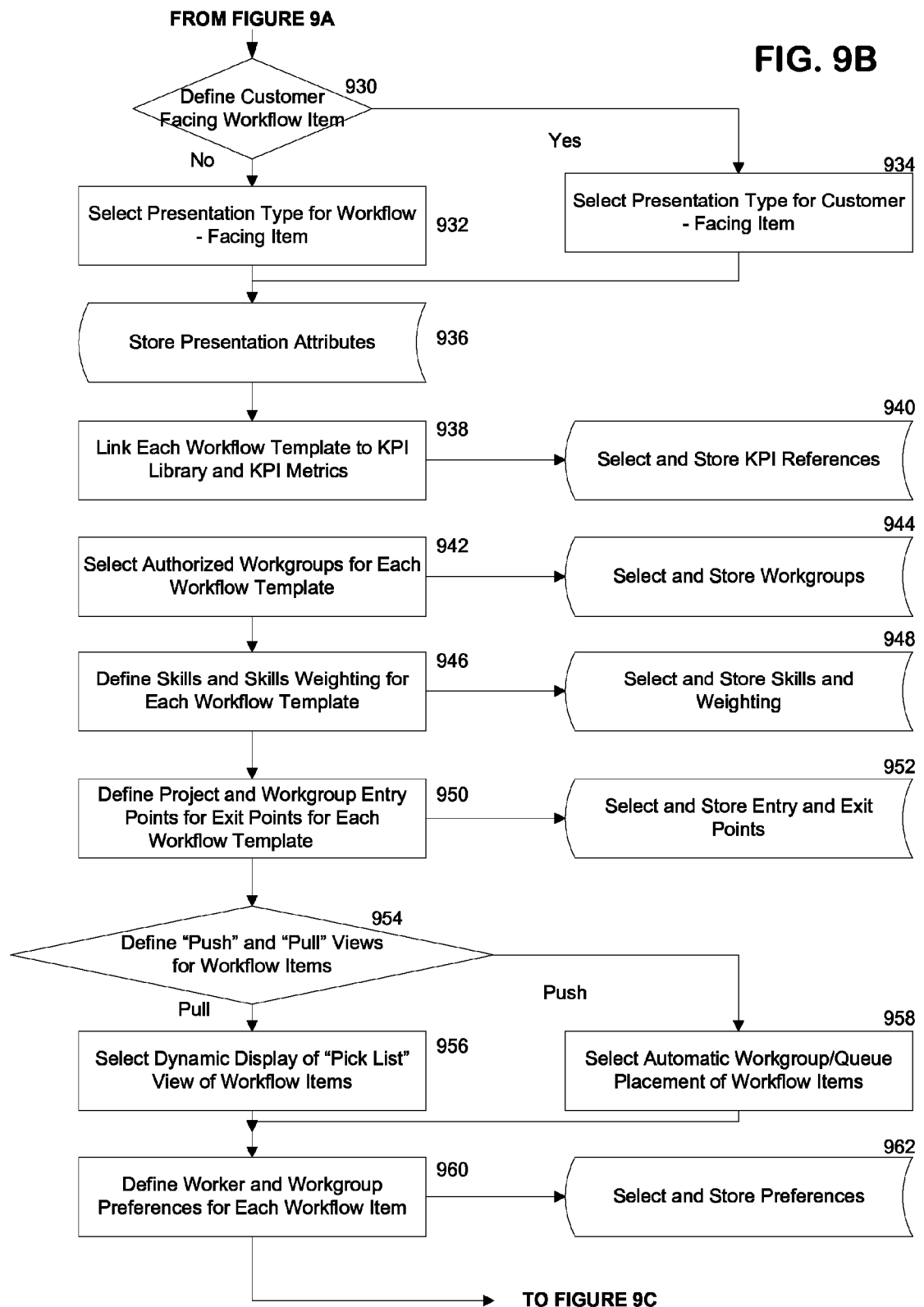
Figure 9C:
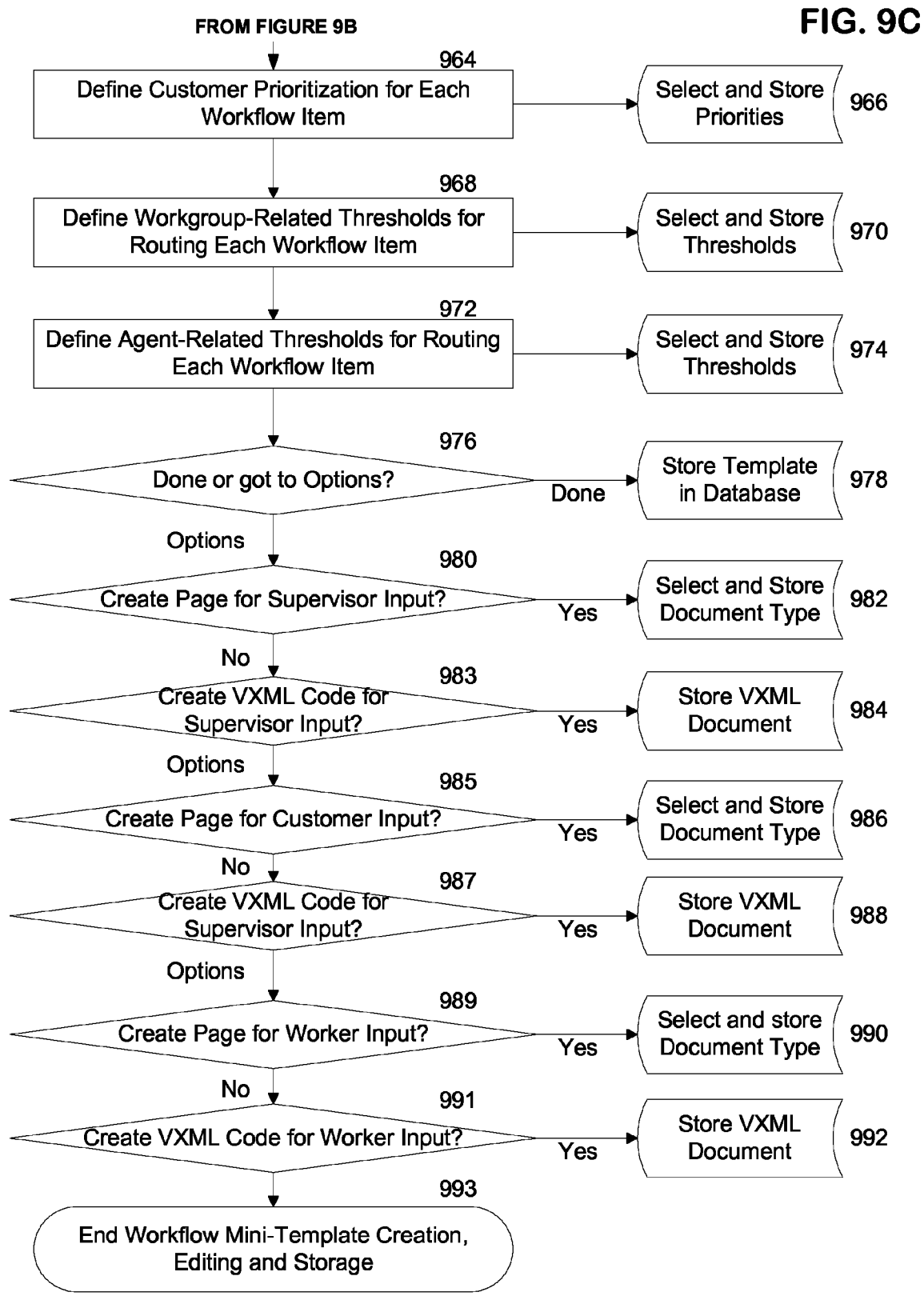
Figure 10:
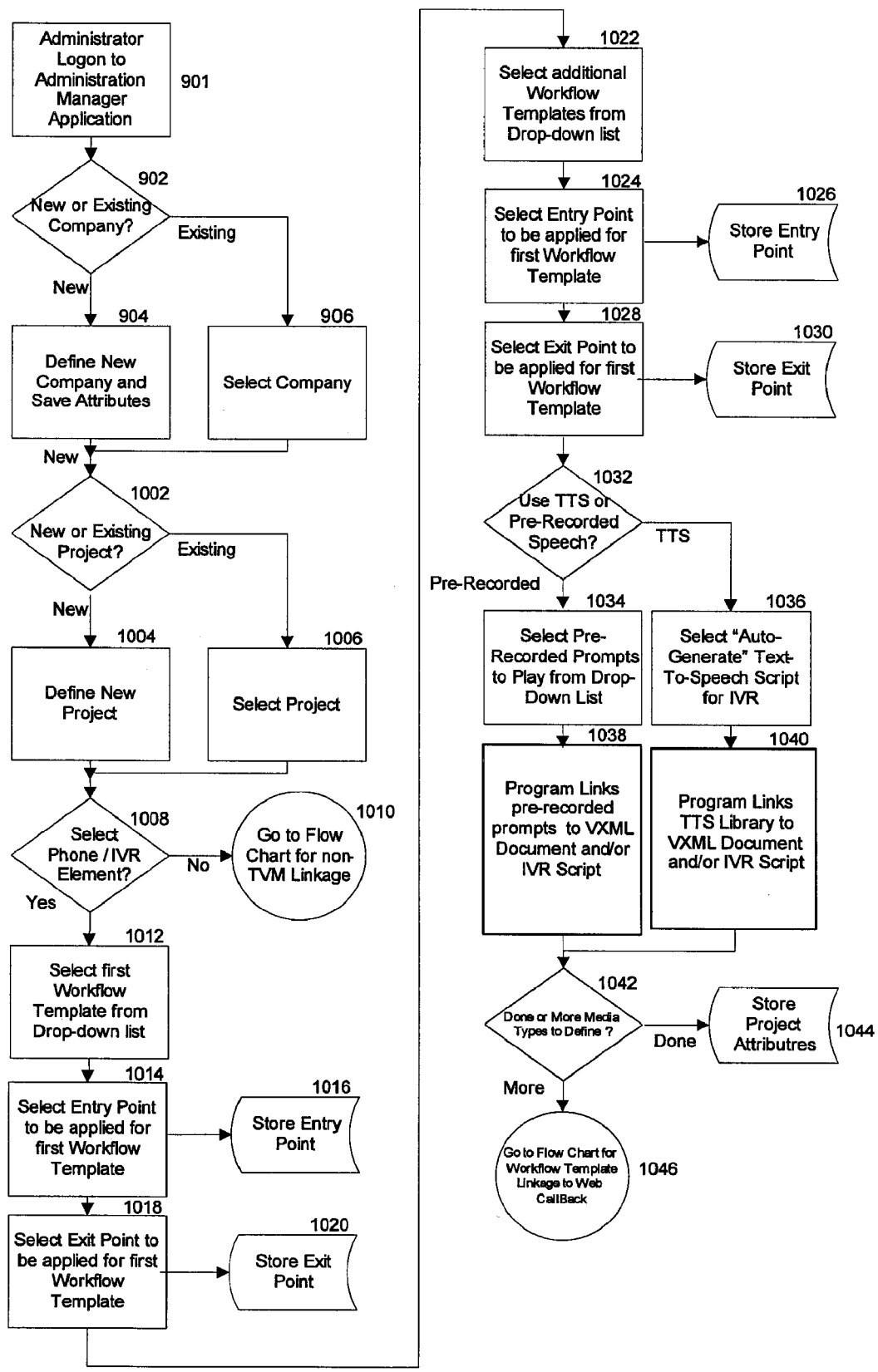
FIG. 10 illustrates a process of linking Workflow Templates to Phone/IVR Projects according to the embodiment of the invention.

FIGS. 9A-C illustrate a process 900 of creating a Workflow Template and storing information relative to that Template in a Workflow Document Server and associated in a Database according to an embodiment of the invention. An administrator will use the Administration Manager interface, as described in U.S. patent Ser. No. 09/798,226, entitled "Call Center Administrator Manager," the disclosure of which is incorporated herein by reference in its entirety, to define Workflow Templates. The process 900 of creating a Workflow Template in a Database begins by the administrator logging on (step 901) to the administration manager application. The software asks (step 902) to specify a new or existing company for which the template is to be associated with. If the company is a new company, the administrator defines (step 904) the new company's attributes. If an existing company, the administrator selects (step 906) the company from a list of companies having information previously stored. The administrator is then asked (step 908) whether a new Workflow Template is being generated or an existing Workflow Template is being edited. If new, the administrator defines (step 910) the new template. If already existing, the administrator selects (step 912) the template she wishes to modify.

Each Workflow Template includes a number of workflow items. For each workflow item, the administrator may define or edit the name (step 914) and then select and store names of each workflow item (step 916). The administrator may also define the Description of each workflow item (step 918) and then select and store the description of each workflow item (step 920). Once the description is defined, the administrator may proceed to build or reference the Workflow Template (step 922). If the administrator chooses to reference the Workflow Template, the referenced item may include a reference to a URL, executable, or query for launching a trusted application (step 926). If the administrator opts to build the Workflow Template, the administrator must select the appropriate fields, labels, and data sources for the Workflow Template (step 924). Once the Workflow Template is either built or referenced by the administrator, the next step allows for the administrator to store the Workflow Template attributes (step 928).

A customer-facing workflow item may be defined by the administrator (step 930). If the administrator chooses to define the customer-facing workflow item, the administrator must then select the presentation type for the customer facing item (step 934). If the administrator opts not to define the customer-facing item, only the presentation type for workforce-facing item is selected (item 932).

Customer-Facing Work Items, as the name implies, are work items and activities that a customer can see or hear. Workforce-Facing Work Items are work items and activities that are for internal use only. Customer-Facing Work Items include, but are not limited to: an IVR dialogue that a customer hears in routing their call or doing automation tasks, a web-based form for filling out a loan application, a web-based form for responding to a customer satisfaction survey, and a customer qualification form as a prerequisite to a chat dialogue. Workforce-Facing Work Items include, but are not limited to: a partially filled-out loan application from a customer that needs to be completed, a workforce-based preference pick list that allows an agent to select work items, a supervisor scoring screen that allows a supervisor to rate the activities of an agent, a trouble ticket that needs to be routed from an agent to a technical support person.

Once the presentation attributes are selected, the next step allows for the administrator to store the presentation attributes (step 936). The administrator then proceeds to link (step 938) each Workflow Template to KPI library and metrics, select authorized workgroups (step 942) for each Workflow Template, define skills and skills weighting (step 946) for each Workflow Template, and define project and workgroup entry/exit points (step 950) for each Workflow Template. For each of steps 938, 942, 946 and 950, the administrator proceeds to select and store each item (steps 940, 944, 948, 952 respectively). Views for each workflow item may then either be defined by the administrator as "push" or "pull" (step 954). If the "push" view is selected, the administrator is then prompted to select an automatic workgroup/queue placement of workflow items (step 958). Alternatively, if the "pull" view is selected, the administrator is prompted to select the dynamic display of "picklist" view of workflow items. The administrator then proceeds to define worker and workgroup item (step 960) for each Workflow Template, define customer prioritization (step 964) for each Workflow Template, define workgroup related thresholds for routing (step 968) for each Workflow Template, and define agent related threshold for routing (step 972) for each Workflow Template. For each of steps 960, 964, 968 and 972, the administrator proceeds to select and store each item (steps 962, 966, 970, 974 respectively).

After all of the elements related to each workflow item are defined and stored, the administrator may then proceed to end the Workflow Template provisioning process or continue to on defining additional options (step 976). If the administrator proceeds to end the provisioning process, then the Workflow Template is stored in the database (step 978). Alternatively, the administrator may proceed not to end the template provisioning process in order to add more options. Options available to the administrator include create page for supervisor input (step 980), create VXML code for supervisor input (step 983), create page for customer input (step 985), create VXML code for supervisor input (step 987), create page for worker input (step 989), and create VXML code for worker input (step 991). If any one of these options is selected, the administrator will be prompted to either select and/or store the document item (steps 984, 986, 988, 990 and 992). The Workflow Template provisioning process subsequently ends after the administrator has successfully completed the selection of options (step 993).

FIGS. 10-13 illustrate processes for linking Workflow Templates and KPI Templates to specific media and/or project types according to at least one embodiment of the invention. For example, the Administrator can also use the Administration Manager interface to link Workflow Templates to specific projects and TVM. For example, the Administrator can associate a template with a phone call logic flow and further define whether the completion of a workflow may trigger a call or other follow-up to the customer. In another example, the Administrator can associate a Workflow Template with a Web-based chat project and further define whether the template should be made to trigger the pushing of an electronic form or other document to that customer in real time during a chat interaction. In another example, the Administrator can associate a template with a Web-based CallBack project and further define whether a Workflow Template and resulting workflow item can be associated with a scheduled call-back based on input from the customer. In another example, the Administrator can associate a Workflow Template and resulting workflow item with an ACD email project and further define whether the template should be made to trigger pre- or post-e-mail input from the customer.

Referring again to FIG. 10, a process 1000 for linking a Workflow Template to a phone/IVR project starts after the administrator logs into the administration manager application and specifies or defines a particular company (step 901). The software asks (step 902) to specify a new or existing company for which the template is to be associated with. If the company is a new company, the administrator defines (step 904) the new company's attributes. If an existing company, the administrator selects (step 906) the company from a list of companies having information previously stored. Next, the administrator is prompted to select either a new or existing project (step 1002). The administrator will either choose to define a new project (step 1004) or select an existing project (step 1006). Once a project is made available, the administrator will be prompted to select a phone/IVR element (step 1008). If the administrator opts not to select a phone/IVR element, then the process proceeds to the Flow Chart for non-TVM Linkage (step 1010) as described in FIG. 14. Otherwise, the administrator is prompted to select the first Workflow Template from a drop-down list (step 1012). Entry/Exit points to be applied for the first Workflow Template must be selected by the administrator (steps 1014/1018) and are subsequently stored (steps 1016/1020). Next, the administrator is prompted to select an additional Workflow Template from another drop-down list (step 1022). Entry/Exit points to be applied for the additional Workflow Template must again be selected by the administrator (steps 1024/1028) and are subsequently stored (steps 1026/1030).

After the entry/exit points have been applied to the Workflow Template, the administrator may choose to use text-to-speech (TTS) or pre-recorded speech (step 1032). If TTS is selected, the administrator is prompted to select "auto-generate" text-to-speech script for IVR (step 1036) while the program subsequently links TTS library to VXML document and/or IVR script (step 1040). Alternatively, if the pre-recorded speech is selected, the administrator is prompted to select pre-recorded prompts to play from down-down list (step 1034) while the program subsequently links pre-recorded prompts to VXML document and/or IVR script (step 1038).

The administrator may choose to define more media types or end the process (step 1042). If the administrator decides to end the provisioning process, the project attributes are stored in a database and the provisioning process ends (step 1044). Otherwise, the administrator will be taken to the process for Workflow Template linkage to web callback (step 1046) as described in FIG. 11.

Figure 11:
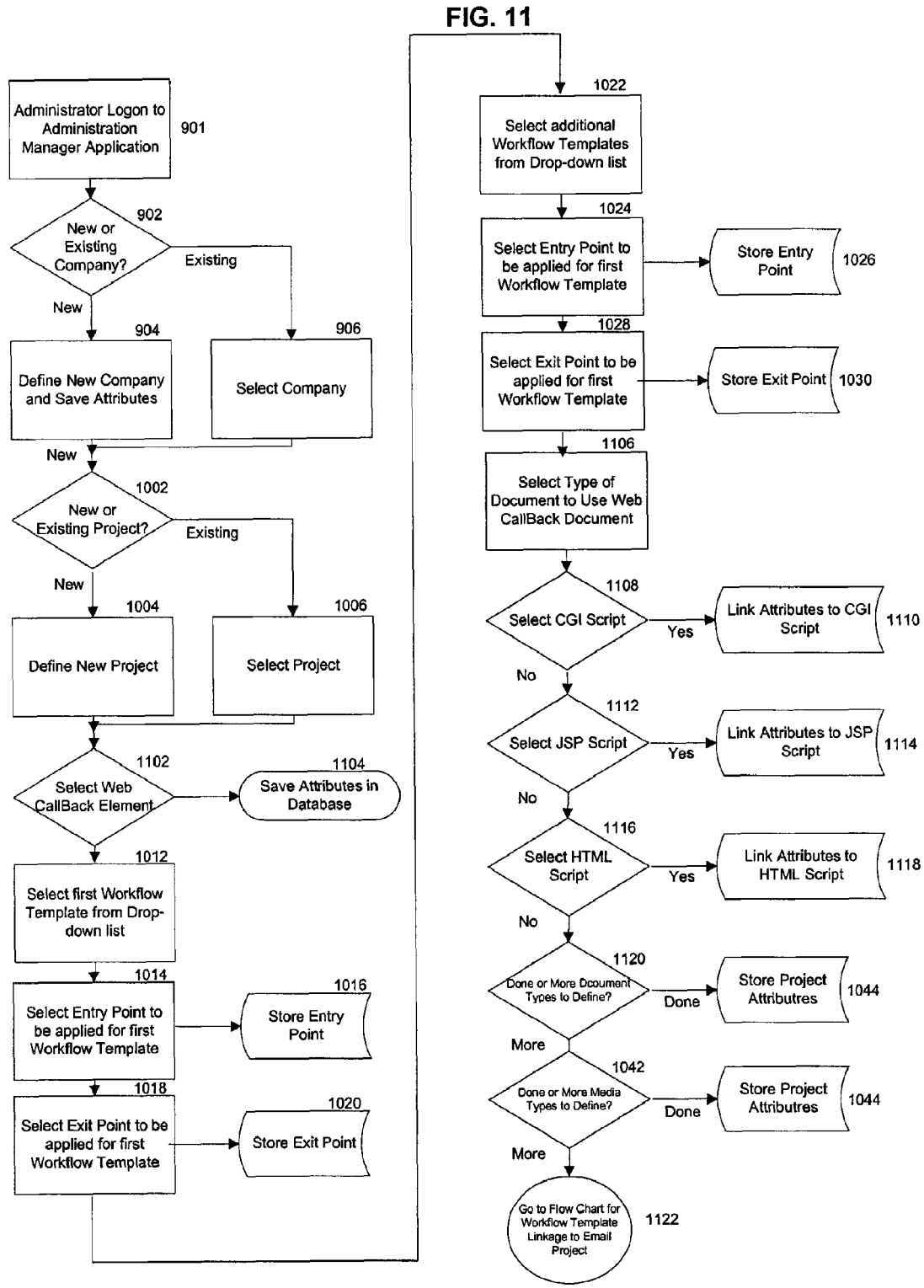
FIG. 11 illustrates a process of linking Workflow Templates to Web CallBack Projects according to the embodiment of the invention.

Referring to FIG. 11, a process 1100 for linking KPI templates to web callback projects starts after the administrator logs into the administration manager application (step 901) and specifies or defines a particular company. The software asks (step 902) to specify a new or existing company for which the template is to be associated with. If the company is a new company, the administrator defines (step 904) the new company's attributes. If an existing company, the administrator selects (step 906) the company from a list of companies having information previously stored. Next, the administrator is prompted to select either a new or existing project (step 1002). The administrator will either choose to define a new project (step 1004) or select an existing project (step 1006). Once a project is made available, the administrator will be prompted to select a web callback element (step 1102). Once the administrator selects a web callback element, the attributes are saved in a database (step 1104). Next, the administrator is prompted to select the first Workflow Template from a drop-down list (step 1012). Entry/Exit points to be applied for the first Workflow Template must be selected by the administrator (steps 1014/1018) and are subsequently stored (steps 1016/1020). Next, the administrator is prompted to select an additional Workflow Template from another drop-down list (step 1022). Entry/Exit points to be applied for the additional Workflow Template must again be selected by the administrator (steps 1024/1028) and are subsequently stored (steps 1026/1030).

After the entry/exit points have been applied to the Workflow Template, the administrator must select type of document to use for web callback document (step 1106). Next, the administrator may select either a CGI, JSP or HTML script (steps 1108, 1112, 1116 respectively) and then subsequently link, after each selection, the attributes to the appropriate script (steps 1110, 1114, 1118).

The administrator may choose to define more media types or end the provisioning process (step 1042). If the administrator decides to end the provisioning process, the project attributes are stored in a database and the provisioning process ends (step 1044). Otherwise, the administrator will be taken to the flow chart for Workflow Template linkage to web callback (step 1046).

The administrator may choose to define more document types or end the provisioning process (step 1120). If the administrator decides to end the process, the project attributes are stored in a database and the provisioning process ends (step 1044). Otherwise, the administrator may choose to define more media types or end the process (step 1042). If the administrator decides to end the process, the project attributes are stored in a database and the process ends (step 1044). Otherwise, the administrator will be taken to the process for Workflow Template linkage to email project (step 1122) as described in FIG. 12.

Figure 12:
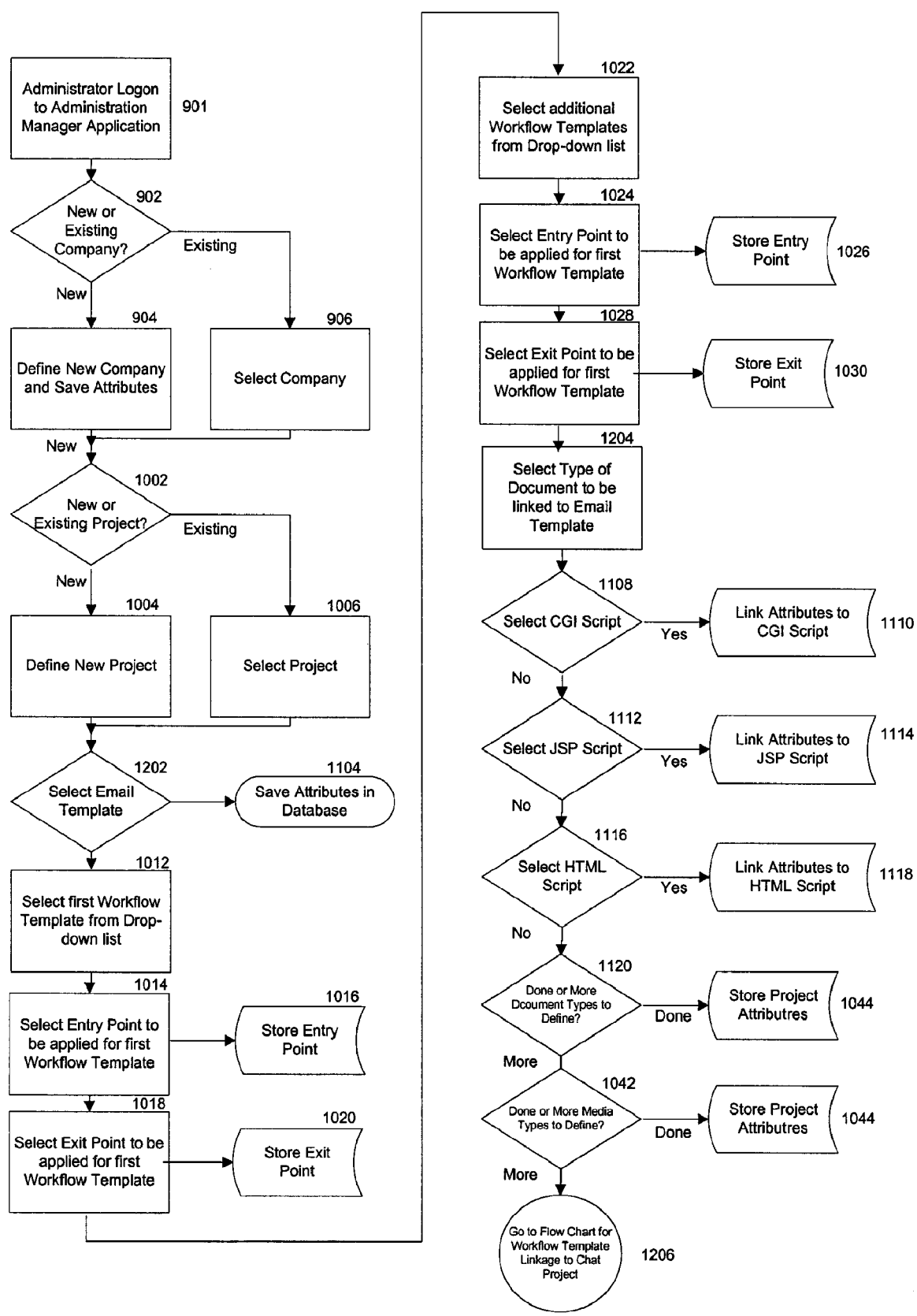
FIG. 12 illustrates a process of linking Workflow Templates to Email Projects according to the embodiment of the invention.

FIG. 12 illustrates a process 1200 for linking Workflow Templates to email projects and starts after the administrator logs into the administration manager application (step 901)

and specifies or defines a particular company. The software asks (step 902) to specify a new or existing company for which the template is to be associated with. If the company is a new company, the administrator defines (step 904) the new company's attributes. If an existing company, the administrator selects (step 906) the company from a list of companies having information previously stored. Next, the administrator is prompted to select either a new or existing project (step 1002). The administrator will either choose to define a new project (step 1004) or select an existing project (step 1006). Once a project is made available, the administrator will be prompted to select an email template (step 1202). Once the administrator selects an email template, then the attributes are saved in a database (step 1104). Next, the administrator is prompted to select the first Workflow Template from a drop-down list (step 1012). Entry/Exit points to be applied for the first Workflow Template must be selected by the administrator (steps 1014/1018) and are subsequently stored (steps 1016/1020). Next, the administrator is prompted to select an additional Workflow Template from another drop-down list (step 1022). Entry/Exit points to be applied for the additional Workflow Template must again be selected by the administrator (steps 1024/1028) and are subsequently stored (steps 1026/1030). This process may be repeated for additional Workflow Templates.

After the entry/exit points have been applied to the Workflow Template, the administrator must select type of document to be linked to the email template (step 1204). Next, the administrator may select either a CGI, JSP or HTML script (steps 1108, 1112, 1116 respectively) and then subsequently link, after each selection, the attributes to the appropriate script (steps 1110, 1114, 1118).

The administrator may choose to define more media types or end the provisioning process (step 1042). If the administrator decides to end the provisioning process, the project attributes are stored in a database and the provisioning process ends (step 1044). Otherwise, the administrator will be taken to the flow chart for Workflow Template linkage to web callback (step 1046), as described in FIG. 11.

The administrator may choose to define more document types or end the provisioning process (step 1120). If the administrator decides to end the provisioning process, the project attributes are stored in a database and the provisioning process ends (step 1044). Otherwise, the administrator may choose to define more media types or end the provisioning process (step 1042). If the administrator decides to end the provisioning process, the project attributes are stored in a database and the provisioning process ends (step 1044). Otherwise, the administrator will be taken to the flow chart for Workflow Template linkage to chat project (step 1206), as described in FIG. 13.

In FIG. 13, a process 1300 for associating a Workflow Template with a Chat project is illustrated according to an embodiment of the invention and starts when the administrator logs on (step 901). The software asks (step 902) to specify a new or existing company for which the template is to be associated with. If the company is a new company, the administrator defines (step 904) the new company's attributes. If an existing company, the administrator selects (step 906) the company from a list of companies having information previously stored. Next, the administrator is prompted to select either a new or existing project (step 1002). The administrator will either choose to define a new project (step 1004) or select an existing project (step 1006). Once a project is made available, the administrator will be prompted to select a chat template (step 1302). Once the administrator selects a chat template, the attributes are stored in a database (step 1104).

Next, the administrator is prompted to select the first Workflow Template from a drop-down list (step 1012). Entry/Exit points to be applied for the first Workflow Template must be selected by the administrator (steps 1014/1018) and are subsequently stored (steps 1016/1020). Next, the administrator is prompted to select an additional Workflow Template from another drop-down list (step 1022). Entry/Exit points to be applied for the additional Workflow Template must again be selected by the administrator (steps 1024/1028) and are subsequently stored (steps 1026/1030). This process may be repeated for additional Workflow Templates.

After the entry/exit points have been applied to the Workflow Template, the administrator must select type of document to be linked to the chat template (step 1304). Next, the administrator may select either a CGI, JSP or HTML script (steps 1108, 1112, 1116 respectively) and then subsequently link, after each selection, the attributes to the appropriate script (steps 1110, 1114, 1118).

The administrator may choose to define more media types or end the provisioning process (step 1042). If the administrator decides to end the provisioning process, the project attributes are stored in a database and the provisioning process ends (step 1044). Otherwise, the administrator will be taken to the flow chart for Workflow Template linkage for non-TVM linkage (step 1046) as described in FIG. 14.

The administrator may choose to define more document types or end the provisioning process (step 1120). If the administrator decides to end the process, the project attributes are stored in a database and the provisioning process ends (step 1044). Otherwise, the administrator may choose to define more media types or end the process (step 1042). If the administrator decides to end the provisioning process, the project attributes are stored in a database and the process ends (step 1044). Otherwise, the administrator will be taken to the flow chart for Workflow Template for non-TVM linkage (step 1306), as described in FIG. 14.

Figure 14:
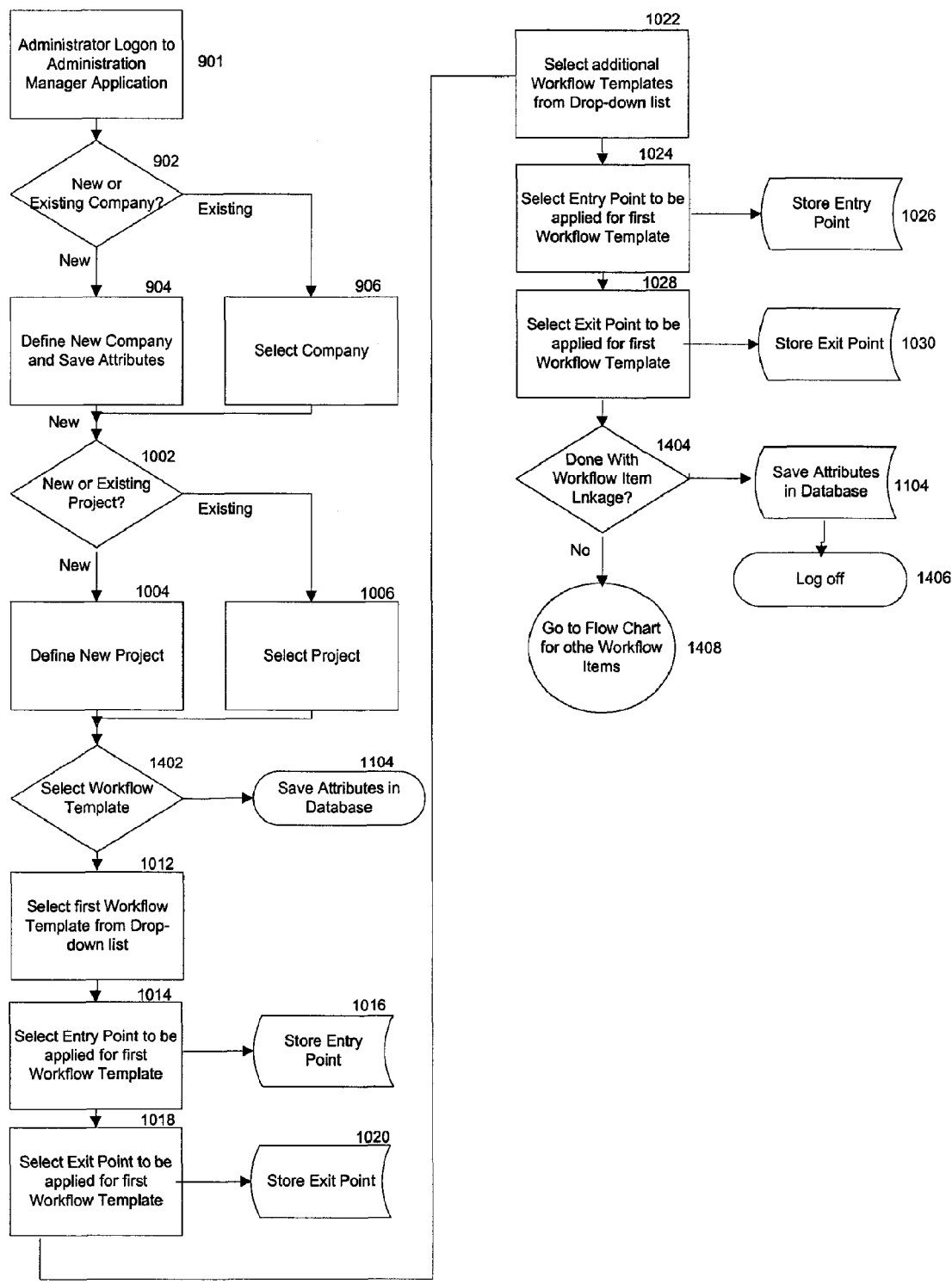
FIG. 14 illustrates a process of linking Workflow Templates to Non-TVM Documents according to the embodiment of the invention.

FIG. 14 illustrates a process 1400 of linking Workflow Templates to non-TVM documents according to an embodiment of the invention and begins when the administrator logs on (step 901). The software asks (step 902) to specify a new or existing company for which the template is to be associated with. If the company is a new company, the administrator defines (step 904) the new company's attributes. If an existing company, the administrator selects (step 906) the company from a list of companies having information previously stored. Next, the administrator is prompted to select either a new or existing project (step 1002). The administrator will either choose to define a new project (step 1004) or select an existing project (step 1006). Once a project is made available, the administrator will be prompted to select a Workflow Template (step 1402). Once the administrator selects a template, then the attributes are saved in a database (step 1104). Next, the administrator is prompted to select the first Workflow Template from a drop-down list (step 1012). Entry/Exit points to be applied for the first Workflow Template must be selected by the administrator (steps 1014/1018) and are subsequently stored (steps 1016/1020). Next, the administrator is prompted to select an additional Workflow Template from another drop-down list (step 1022). Entry/Exit points to be applied for the additional Workflow Template must again be selected by the administrator (steps 1024/1028) and are subsequently stored (steps 1026/1030). This process may be repeated for additional Workflow Templates.

After the entry/exit points have been applied to the Workflow Template, the administrator is prompted to end the provisioning process or continue to next flow chart (step 1404). If the administrator chooses to complete the provisioning process, the workflow attributes are saved in the database (step 1104) and subsequently logged off (step 1406). Otherwise, the administrator is taken to the flow chart for other workflow items (step 1408).

Figure 15:
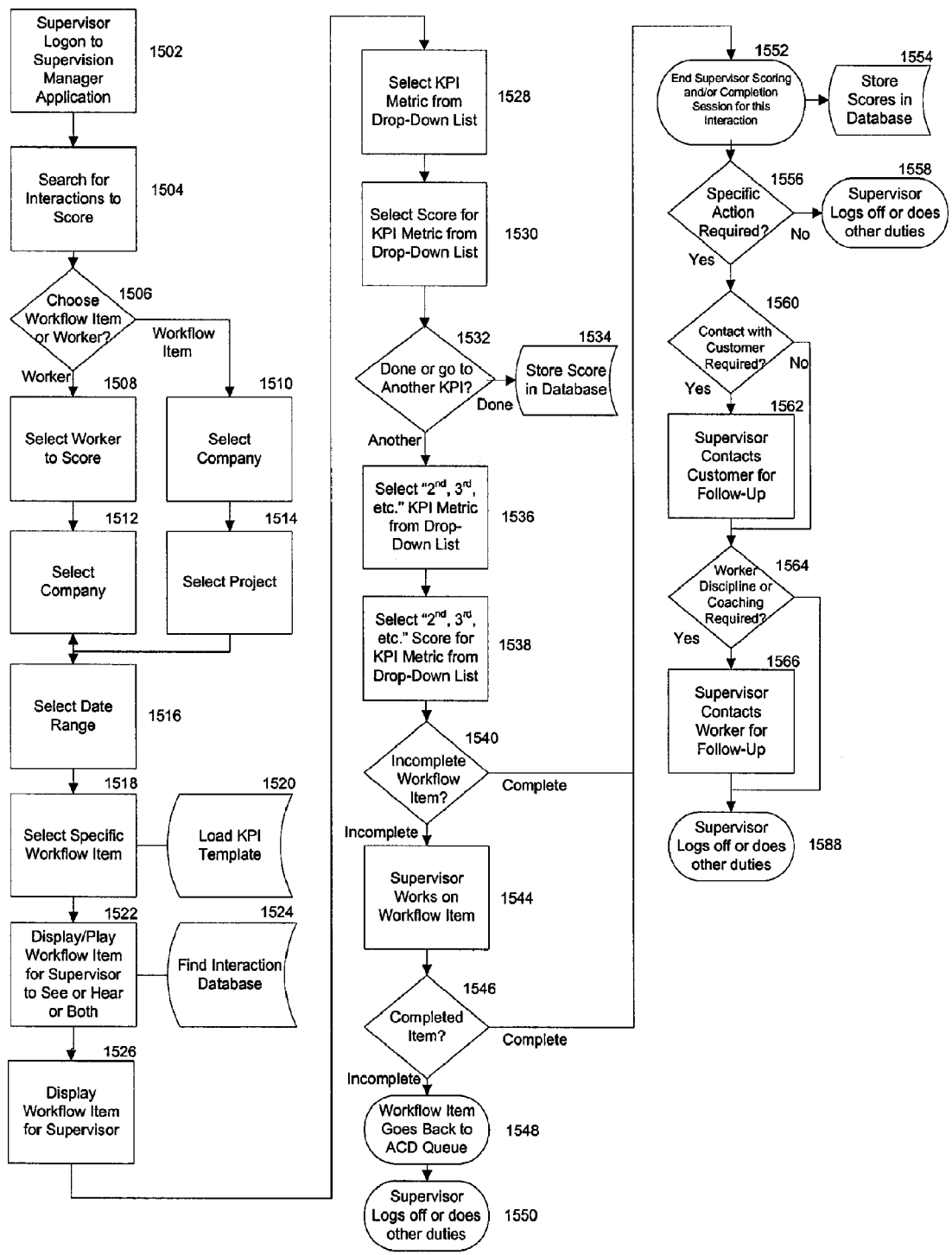
FIG. 15 illustrates a process of Supervisor View of Workflow Templates and Agent Performance according to the embodiment of the invention.

FIG. 15 illustrates the Supervisor View of Workflow Document and Agent Performance according to an embodiment of the invention. Supervisors can score agent and knowledge worker performance (KPIs) based on the efficient handling of workflow items based on the Workflow Templates created in the second aspect of the invention. Such scoring will store values in the database which can be made to have an effect on subsequent routing decisions in TVM (phone calls, e-mails, chats, web call-backs) and non-TVM (electronic forms and workflow documents, see FIG. 14) for example, but are not limited to these workflow item types. In a preferred embodiment of the invention, the Supervisor would use the Supervision Manager to select specific workflow items based on a plurality of search criteria including company, customer, agent, knowledge worker and specific workflow item. Further, the Supervisor would be able to select a specific workflow item based on the stored template mentioned above, and answer questions dealing with scoring and weighting the KPIs in question for that agent.

Referring to FIG. 15, a process 1500 of supervisor view of Workflow Templates and agent performance according to an embodiment of the invention and starts when the supervisor logs on to the supervision manager application (step 1502). The supervisor then proceeds to search for interaction to score (step 1504) where the supervisor may either select a worker or workflow item (step 1506). If a workflow item is selected, the supervisor is prompted to select a company (step 1510) and project (step 1514). If, on the other hand, a worker is selected, the supervisor is prompted to select a worker to score (step 1508) and the company (step 1512). The supervisor must then select a date range (step 1516) followed by selecting a specific workflow item (step 1518). Selecting the specific workflow item includes loading the KPI template (step 1520). Once the workflow item is selected, the workflow item is displayed/played for the supervisor to see or hear or both (step 1522). This step further includes finding the interaction in the database (step 1524).

Once the workflow item is displayed for the supervisor (step 1526), the supervisor may choose to select the appropriate KPI metric (step 1528) and score for KPI metric (step 1530) from the drop-down list. The supervisor may add subsequent KPI metric or choose to complete this step (step 1532). If no additional KPI metrics is selected, the scores are stored in the database (step 1534). Otherwise, the supervisor is given additional KPI metrics and score for KPI metrics to select from (steps 1536, 1538). The supervisor must next address workflow items that are either complete or incomplete (step 1548). For incomplete workflow items, the supervisor attempts to work to complete these items (1544) and again queried on whether the item is or is not complete (step 1546). Incomplete items go back to the ACD queue (step 1548) while the supervisor proceeds to log off or return to other duties (step 1550). Completed items (with or without supervisor intervention) are sent to next step where the supervisor scoring ends and/or completion of session for this interaction ends (step 1552). Scores for this session are then stored in a database (step 1554). Next, the supervisor is queried for any required specific actions to take (step 1556). If no actions are required, the supervisor may log off or attend to other duties (step 1558). If a specific action is required, the supervisor is queried on whether or not contact with customer is required (step 1560). If contact with a customer is required, then the supervisor must contact the customer for follow-up (step 1562). The supervisor is again queried to take action regarding whether or not worker discipline or coaching is required (step 1564). If worker discipline or coaching is required, the supervisor must then contact the worker for follow-up (step 1566). If no further actions are required, the supervisor may subsequently log off or returns to other duties (step 1588).

FIGS. 16 and 17A-C illustrate processes for Customer Scoring of Workflow examples of specific media types. Customers will have the ability to participate in the completion of workflow items. For example, a loan application may be partially filled-out by a customer. Subsequent to the form being partially filled-out, the Workflow item ACD may route that form or document to a knowledge worker who checks and verifies certain data. Subsequent to the knowledge worker checking and verifying certain data, the Workflow ACD may route the modified form back to the customer for completion. This cycle may repeat itself or be modified to include various participants until the successful conclusion of the interaction(s) and workflow. In addition, customers may provide their own input on KPI measures based on their interactions with the agents, knowledge workers, supervisors and workflow items that they came into contact with. Such additional input may be accommodated in a plurality of media types. For example, customers may provide spoken or touch-tone input during an automated IVR-based (Interactive Voice Response) telephone call. Such input may be further used to dynamically route the interaction so the customer can get customized treatment during that interaction—or the data may be stored and used as a means to route and treat subsequent interactions—or that data may be used to act both on the current interaction and also subsequent interactions. Such customer-solicited input may also be gotten with interactions with e-mails, or web-based callback and chat interactions in the form of questionnaires that are screen-based. For example, such questionnaires can be automatically generated by the system as described earlier in the form of XML, EDI, JSP, CGI, or HTML-based documents which are then associated with a specific project and thus a specific workflow item for the customer interaction.

Figure 16:
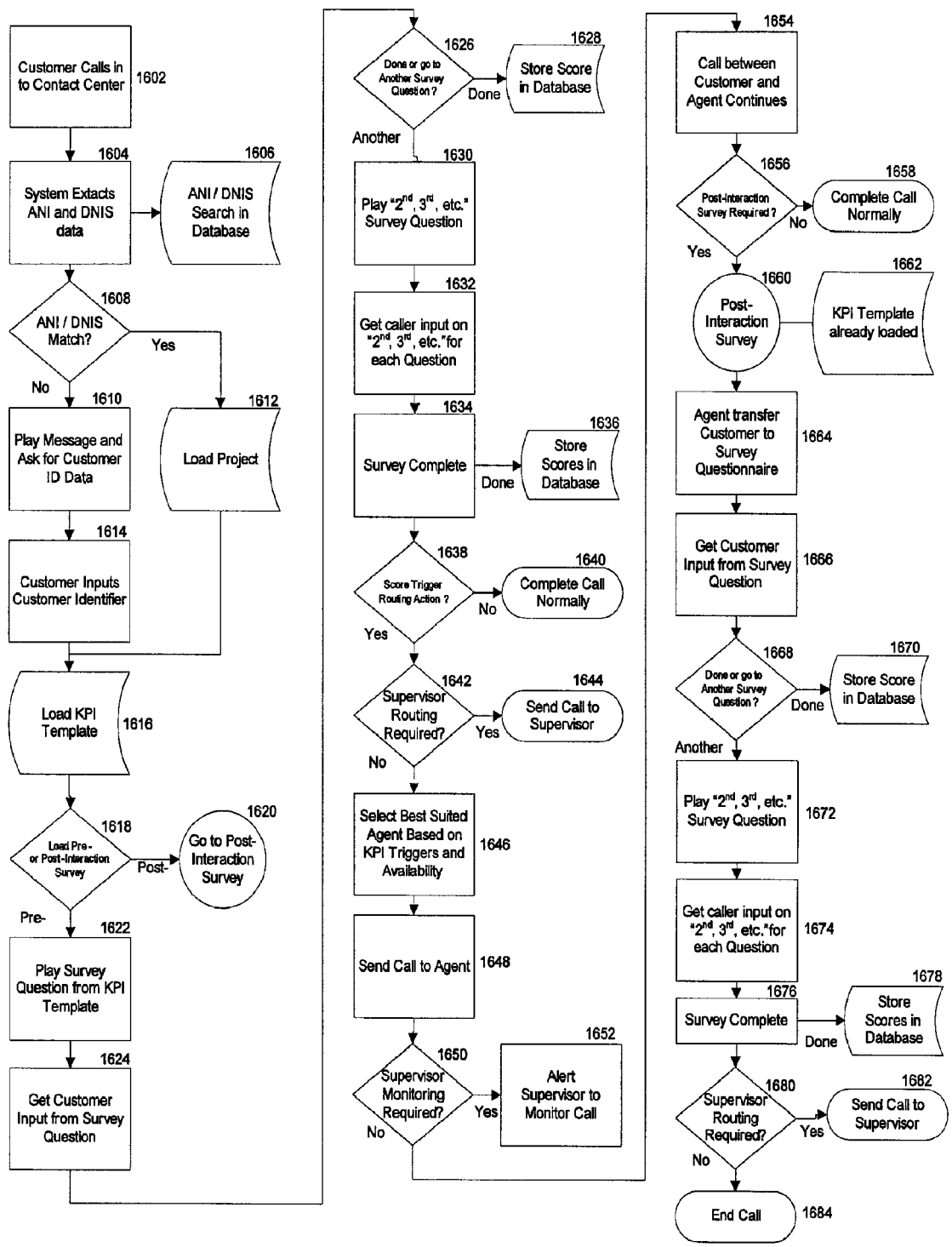
FIG. 16 illustrates a process of Customer Scoring of Workflow Interaction Phone Call Example according to the embodiment of the invention.

Referring to FIG. 16, a process 1600 of customer scoring of workflow interaction phone call example according to an embodiment of the invention and starts when the customer calls in the contact center (step 1602). Beginning at step 1602, when a customer calls the Contact Center, the system extracts the ANI and DNIS data (step 1604) where the data is searched in a database (step 1606). The system checks whether or not the customer data matches the data found in the database (step 1608). If the customer data does not match, the system plays a message and queries the customer for customer ID data (step 1610). The customer next action is to input their customer identifier number (step 1614). In the case where the customer data match, the system proceeds to load the project (step 1612). Next, the KPI template is loaded (step 1616). The customer is then queried to load an interaction survey (step 1618). If the customer selects the Post-Interaction survey, the customer proceeds to the Post Interaction survey process (step 1620). If the customer selects the Pre-Interaction survey, the system plays questions from the KPI template (step 1622) following a request for customer input from the survey question (step 1624).

Following the customer input to the survey question, the customer is then queried for another survey (step 1626). If the customer decides to end the survey, the scores are stored in a database (step 1628). If the customer opts for additional survey questions, additional survey questions are played back to the customer (step 1630). For each survey question presented to the customer, the customer input is requested (step 1632). Once all additional survey questions are done, the survey is complete (step 1634) and the scores are stored in the database (step 1636). The score value is then compared to a score trigger value where additional routing may be required (step 1638). If no score trigger is initiated, the original call is answered normally (step 1640). However, if the score trigger is initiated, additional routing action is required where the call is sent to the supervisor routing (1642) for further action. At the supervisor routing step (step 1642), if routing is determined to be required, the original call is sent to the supervisor (step 1644). Otherwise, the call is sent to the best suited agent based on KPI Triggers and availability (step 1646). Once a call is routed to an appropriate agent (step 1648), supervisor monitoring is either required or not depending on Agent's response (step 1650). If supervisor monitoring is required, then an alert is sent to supervisor to monitor the Agent screen (step 1652). If no monitoring is required, the transaction between the customer and Agent continues (step 1654).

Towards the end of the transaction between the customer and Agent (step 1654), the customer is queried on whether to participate in a post interactive survey (step 1656). If the customer opts not to participate, the transaction ends (step 1658). Otherwise, the transaction is sent to the post interaction survey (step 1660) where the KPI Template is loaded (step 1662). At this time, the agent transfers the customer to survey questions (step 1664). Following the customer input to the survey question (step 1666), the customer is then queried for another survey (step 1668). If the customer decides to end the survey, the scores are stored in a database (step 1670). If the customer opts for additional survey questions, additional survey questions are played back to the customer (step 1672). For each survey question presented to the customer, the customer input is requested (step 1674). Once all additional survey questions are done, the survey is complete (step 1676) and the scores are stored in the database (step 1678). At the supervisor routing step (step 1680), if routing is determined to be required, the call is sent to the supervisor (step 1682). Otherwise, the transaction ends (step 1684).

Figure 17A:
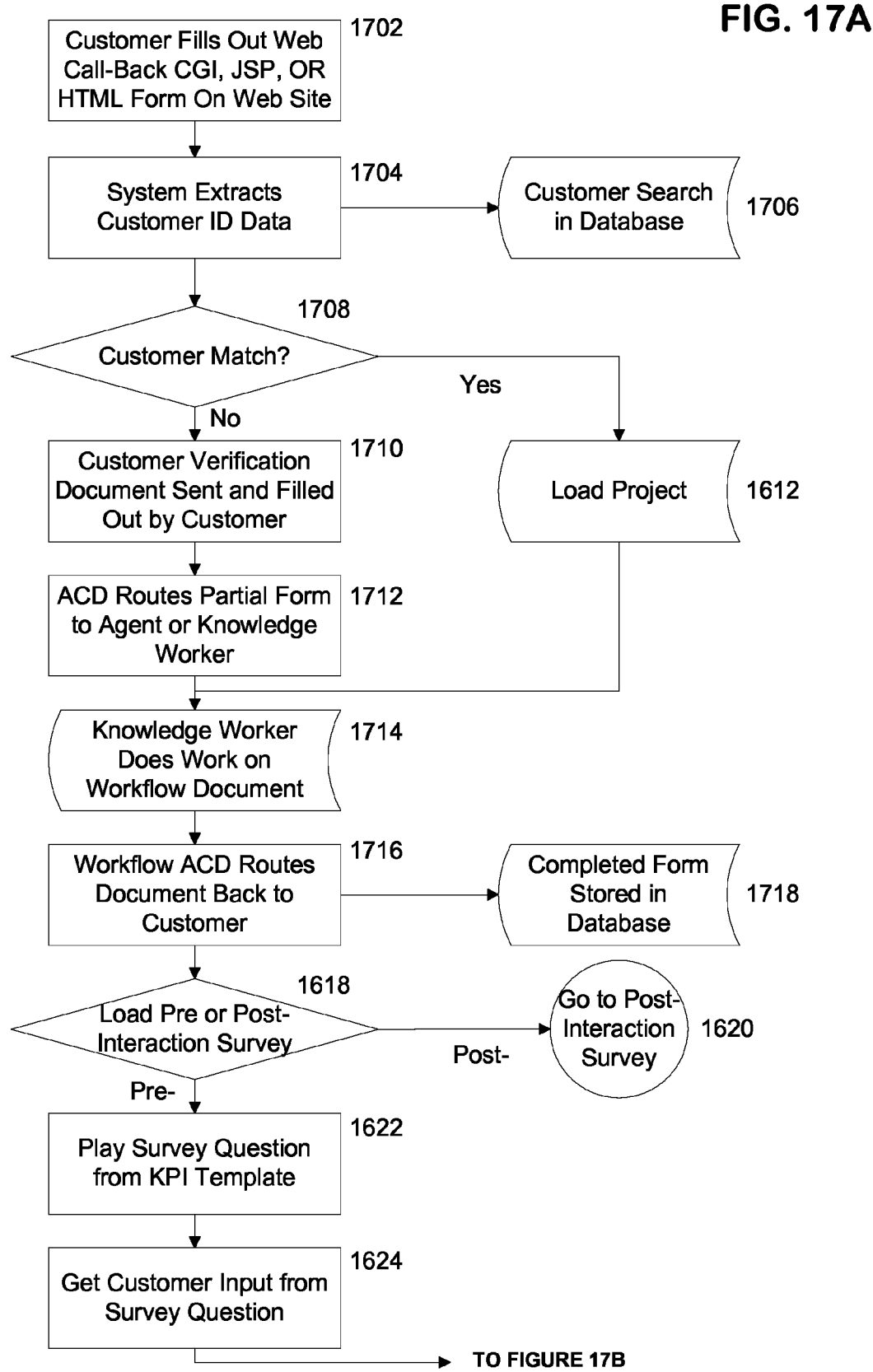
FIGS. 17A-C illustrate a process of Customer Scoring of non-TVM Workflow Document Example according to the embodiment of the invention.
Figure 17B:
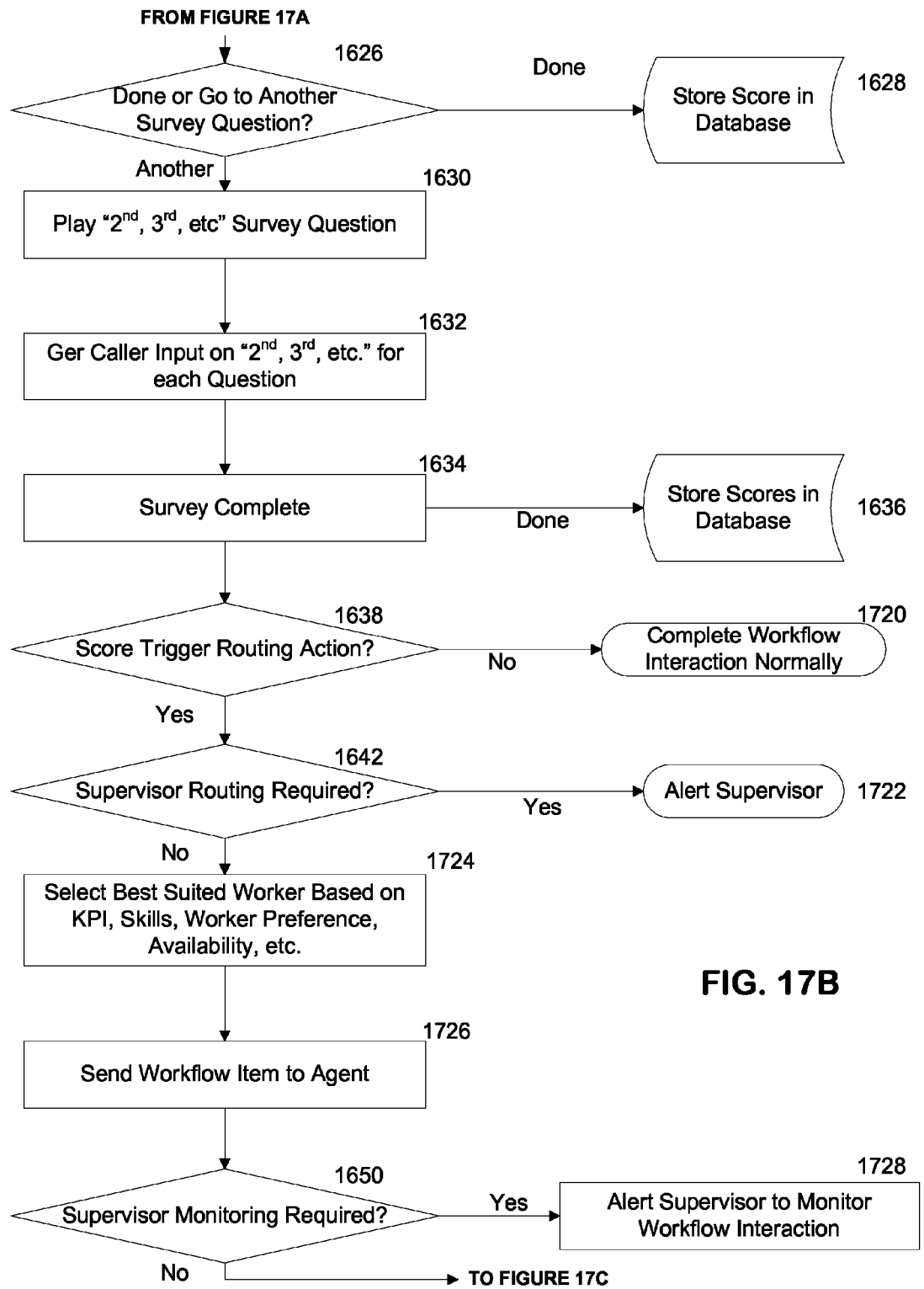
Figure 17C:
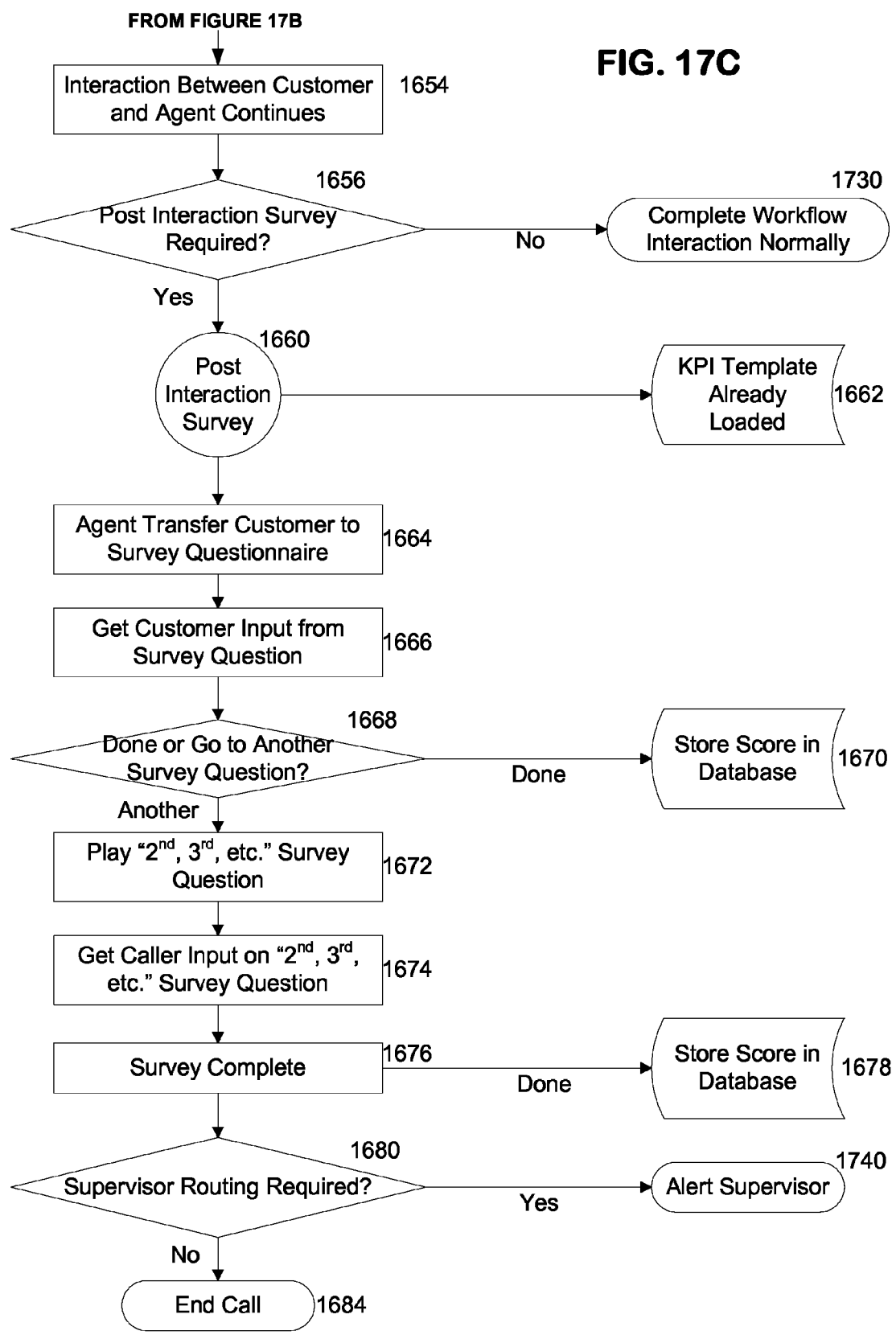

Referring to FIGS. 17A-C, a process 1700 of customer scoring of non-TVM workflow document example according to an embodiment of the invention and starts when a customer fills out a web callback form (step 1702). Beginning at step 1702, when a customer fills out a web callback CGI, JSP or HTML form on the website, the system extracts the customer data (step 1704) and the customer record is searched in a database (step 1706). The system checks whether or not the customer matches the data found in the database (step 1708). If the customer data does not match, a customer verification document is sent to the customer to fill out (step 1710). Subsequently, the ACD routes a partial form to an agent or knowledge worker (step 1712). In the case where the customer data match, the system proceeds to load the project (step 1612). Next, the knowledge worker proceeds to work on the workflow document (step 1714). The workflow ACD subsequently routes the document back to the customer (step 1716) where the completed document is stored in a database (step 1718). The customer is then queried to load an interaction survey (step 1618). If the customer selects the Post-Interaction survey, the customer proceeds to the Post Interaction survey process (step 1620). If the customer selects the Pre-Interaction survey, the system plays questions from the KPI template (step 1622) following a request for customer input from the survey question (step 1624).

Following the customer input to the survey question, the customer is then queried for another survey (step 1626). If the customer decides to end the survey, the scores are stored in a database (step 1628). If the customer opts for additional survey questions, additional survey questions are played back to the customer (step 1630). For each survey question presented to the customer, the customer input is requested (step 1632). Once all additional survey questions are done, the survey is complete (step 1634) and the scores are stored in the database (step 1636). The score value is then compared to a score trigger value where additional routing may be required (step 1638). If no score trigger is initiated, the original workflow item is completed normally (step 1720). However, if the score trigger is initiated, additional routing action is required where the workflow is sent to the supervisor routing (1642) for further action. At the supervisor routing step (step 1642), if routing is determined to be required, an alert is sent to the supervisor (step 1722). Otherwise, the workflow is sent to the best suited worker based on KPI Triggers and availability (step 1724). Once the workflow item is routed to an appropriate agent (step 1726), supervisor monitoring is either required or not depending on Agent's response (step 1650). If supervisor monitoring is required, then an alert is sent to supervisor to monitor the workflow interaction (step 1728). If no monitoring is required, the interaction between the customer and Agent continues (step 1729).

Towards the end of the interaction between the customer and Agent (step 1729), the customer is queried on whether to participate in a post interaction survey (step 1656). If the customer opts not to participate, the workflow interaction ends (step 1730). Otherwise, the interaction is sent to the post interaction survey (step 1660) where the KPI Template is loaded (step 1662). At this time, the agent transfers the customer to survey questions (step 1664). Following the customer input to the survey question (step 1666), the customer is then queried for another survey (step 1668). If the customer decides to end the survey, the scores are stored in a database (step 1670). If the customer opts for additional survey questions, additional survey questions are played back to the customer (step 1672). For each survey question presented to the customer, the customer input is requested (step 1674). Once all additional survey questions are done, the survey is complete (step 1676) and the scores are stored in the database (step 1678). At the supervisor routing step (step 1680), if routing is determined to be required, an alert is sent to the supervisor (step 1740). Otherwise, the transaction ends (step 1684).

Referring to FIG. 18, a process 1800 of worker-initiated preferences of workflow items according to an embodiment of the invention and starts when the worker logs on to the workflow ACD logon page (step 1802). Beginning at step 1802, when the worker logs on to the workflow ACD logon page, the system validates the worker ID (step 1804) where the worker is searched in a database (step 1806). The system checks whether or not the worker matches the data found in the database (step 1808). If the worker data does not match, the worker must re-validate or is automatically logged off (step 1810). Once validated, the workflow item the worker is authorized to view is pulled (step 1814). In the case where the worker data match, the system proceeds to load the available workflow items the worker is authorized to view (step 1812). Next, the worker is queried to choose between a dynamic selection or modified stored preferences (step 1816). If the worker selects the modified stored option, the worker then is able to select the stored preferences and modify it accordingly (step 1820). The stored preferences are subsequently stored in the database (step 1822). Alternatively, if the worker selects the dynamic selection, the system displays the current workflow items available (step 1818) where the worker is able to select preferred workflow items in the ACD queue (step 1824)

which is then updated (step 1826). The worker may then proceed to log off ending the process (step 1828).

The present invention provides a service creation environment for handling manual, automatic or semi-automatic manipulation of a plurality of workflow items. The process of facilitating workflow items is accomplished via Workflow Templates and associated projects created in the Administration Manager which is provided in a user-friendly interface such that it is easy and repeatable. Further, the creation of a Workflow Template and associated logic generates many views of that logic, e.g., IVR, CGI, Web CallBack, etc. The service creation environment gives the administrator the ability to choose dynamic vs. static indicators and linkage to a plurality of media types. Furthermore, these Workflow Templates are portable among call center systems.

Other embodiments and uses of the invention will be apparent to those skilled in the art from consideration of the specification and practice of the invention disclosed herein. Although the invention has been particularly shown and described with reference to several preferred embodiments thereof, it will be understood by those skilled in the art that various changes in form and details may be made therein without departing from the spirit and scope of the invention as defined in the appended claims.

The invention claimed is:

1. A method for facilitating a workflow using a workflow template in a call center, comprising the steps of:
   providing a first workflow template associated with a workflow item, wherein the first workflow template includes data and scripts for rendering the workflow template and one or more routing rules and one or more trigger points defined for said workflow item,
      wherein said each trigger point specifies an action to be taken with respect to said workflow item, including routing and supervisor intervention,
      wherein said one or more routing rules include a workgroup-related threshold that triggers a routing action to be taken with respect to the workgroup, and an agent-related threshold that triggers a routing action to be taken with respect to the agent;
   linking said first workflow template to a project of an interaction type, wherein the interaction type is one of a phone, web callback, email, and chat, wherein the linking is performed by
      receiving, via a manager application, a first selection of a project template defining the interaction type from a predefined dropdown list of project templates, wherein the first selection generates a second dropdown list of one or more workflow templates including the first workflow template, and a third dropdown list of one or more additional workflow templates,
      receiving a second selection of the first workflow template from the second dropdown list,
      receiving a third selection of a third workflow template from the third dropdown list,
      receiving a selection of an entry and exit points for each of the workflow templates selected in the second and third selections, and
      storing attributes of each of the project template and workflow templates selected in the first, second and third selections and attributes of the entry and exit points, wherein each attribute is linked to at least one of a plurality of scripts used to generate logic flows for the project;
   routing said workflow item according to the one or more routing rules as defined in the first workflow template, via a server running on one or more microprocessors, to at least one of an agent and a knowledge worker; and
   receiving a score via a survey of a supervisor and the score being based on a key performance indicator (KPI) library linked to the workflow template selected in the second or third selection and selected from a KPI dropdown list associated with said at least one of an agent and a knowledge worker based on the agent's or the knowledge worker's handling of said workflow item associated with the first workflow template in the project, wherein one or more scoring values are stored in a database and are used for subsequent routing decisions.

2. The method of claim 1, wherein the workflow template is created by associating with a Web page or VXML (Voice Extensible Markup Language) code to collect input from a party.

3. The method of claim 2, wherein said party is a call center supervisor, call center customer, or a call center agent.

4. The method of claim 2, wherein said step of creating the workflow template further comprises the step of selecting a presentation type for said workflow item.

5. The method of claim 1, wherein said workflow item comprises a document.

6. The method of claim 1 wherein the plurality of scripts include a CGI (Common Gateway Interface), JSP (Java Server Page), VXML (Voice Extensible Markup Language), XML (Extensible Markup Language), EDI (Electronic Data Interchange), or HTML (Hypertext Markup Language) page/script.

7. The method of claim 4 wherein the step of selecting a presentation type is at least partially based upon whether the workflow item is a customer-facing workflow item or a workforce-facing workflow item.

8. The method of claim 2, wherein the step of creating the workflow template further comprises the step of defining a push view or a pull view for the workflow item.

9. The method of claim 8, wherein the step of defining the push view or the pull view for the workflow item comprises:
   responsive to the workflow item being a push view item, selecting an automatic workgroup for placement of the workflow item; and
   responsive to defining the pull view for workflow item, selecting a dynamic display "picklist" view for the workflow item wherein the workflow item is presented in a list to a workforce for selection.

10. The method of claim 1 wherein the step of creating the workflow template further comprises defining at least one weighting value for setting an importance level of the workflow item for routing.

11. The method of claim 10 wherein the at least one weighting value comprises:
   an agent preference;
   a workgroup preference; and
   a customer prioritization.

12. The method of claim 1 wherein the one or more trigger points for said workflow item is a skill related to an agent skill or a workgroup skill and a skill weighting of an importance value of the skill.

13. The method of claim 1 wherein the step of creating the workflow template further comprises:
   responsive to the workflow template being a referenced workflow template, linking the workflow template to at least one of: a reference uniform resource locator (URL), an executable, or a query for launching an application; and
   responsive to the workflow template being a non-referenced workflow template, building the workflow template by linking the workflow template to at least one of: a set of fields, a set of labels, and a set of data sources.

14. The method of claim 1 wherein the project deals with both time varying media and non-time varying media workflow template handling.

15. The method of claim 1 further comprising the step of loading a key performance indicator (KPI) template associated with said workflow item and allowing the supervisor to select a KPI metric from a list and score for the KPI metric.

16. The method of claim 1 further comprising the step of allowing one or more customers to provide their input on KPI measures based on their interaction with at least one of an agent and a knowledge worker, wherein such input is further used to dynamically route at least one of a current interaction and subsequent interactions.

17. A non-transitory computer readable storage medium, including instructions stored thereon for facilitating a workflow using a workflow template in a call center, the instructions, when executed by a computer, causing the computer to perform a method comprising:
   providing a first workflow template associated with a workflow item, wherein the first workflow template includes data and scripts for rendering the workflow template and one or more routing rules and one or more trigger points defined for said workflow item,
      wherein said each trigger point specifies an action to be taken with respect to said workflow item, including routing and supervisor intervention,
      wherein said one or more routing rules include a workgroup-related threshold that triggers a routing action to be taken with respect to the workgroup, and an agent-related threshold that triggers a routing action to be taken with respect to the agent;
   linking said first workflow template to a project of an interaction type, wherein the interaction type is one of a phone, web callback, email, and chat, wherein the linking is performed by
      receiving, via a manager application, a first selection of a project template defining the interaction type from a predefined dropdown list of project templates, wherein the first selection generates a second dropdown list of one or more workflow templates including the first workflow template, and a third dropdown list of one or more additional workflow templates,
      receiving a second selection of the first workflow template from the second dropdown list,
      receiving a third selection of a third workflow template from the third dropdown list,
      receiving a selection of an entry and exit points for each of the workflow templates selected in the second and third selections, and
      storing attributes of each of the project template and workflow templates selected in the first, second and third selections and attributes of the entry and exit points, wherein each attribute is linked to at least one of a plurality of scripts used to generate logic flows for the project;
   routing said workflow item according to the one or more routing rules as defined in the first workflow template, via a server running on one or more microprocessors, to at least one of an agent and a knowledge worker; and
   receiving a score via a survey of a supervisor and the score being based on a key performance indicator (KPI) library linked to the workflow template selected in the second or third selection and selected from a KPI dropdown list associated with said at least one of an agent and a knowledge worker based on the agent's or the knowledge worker's handling of said workflow item associated with the first workflow template in the project, wherein one or more scoring values are stored in a database and are used for subsequent routing decisions.

18. The non-transitory computer readable storage medium of claim 17, wherein defining the one or more trigger points includes defining a time-varying media event to act as a trigger point.

19. A system for facilitating a workflow using a workflow template in a call center, comprising:
   a computer, including a computer readable medium, a processor and a memory coupled to the processor,
   one or more servers executed from the memory to
      providing a first workflow template associated with a workflow item, wherein the first workflow template includes data and scripts for rendering the workflow template and one or more routing rules and one or more trigger points defined for said workflow item,
         wherein said each trigger point specifies an action to be taken with respect to said workflow item, including routing and supervisor intervention,
         wherein said one or more routing rules include a workgroup-related threshold that triggers a routing action to be taken with respect to the workgroup, and an agent-related threshold that triggers a routing action to be taken with respect to the agent;
      linking said first workflow template to a project of an interaction type, wherein the interaction type is one of a phone, web callback, email, and chat, wherein the linking is performed by
         receiving, via a manager application, a first selection of of a project template defining the interaction type from a predefined dropdown list of project templates, wherein the first selection generates a second dropdown list of one or more workflow templates including the first workflow template, and a third dropdown list of one or more additional workflow templates,
         receiving a second selection of the first workflow template from the second dropdown list,
         receiving a third selection of a third workflow template from the third dropdown list,
         receiving a selection of an entry and exit points for each of the workflow templates selected in the second and third selections, and
         storing attributes of each of the project template and workflow templates selected in the first, second and third selections and attributes of the entry and exit points, wherein each attribute is linked to at least one of a plurality of scripts used to generate logic flows for the project;
      routing said workflow item according to the one or more routing rules as defined in the first workflow template, via a server running on one or more microprocessors, to at least one of an agent and a knowledge worker; and
      receiving a score via a survey of a supervisor and the score being based on a key performance indicator (KPI) library linked to the workflow template selected in the second or third selection and selected from a KPI dropdown list associated with said at least one of an agent and a knowledge worker based on the agent's or the knowledge worker's handling of said workflow item associated with the first workflow template in the project, wherein one or more scoring values are stored in a database and are used for subsequent routing decisions.

20. The system of claim 19, wherein defining the one or more trigger points includes defining a time-varying media event to act as a trigger point.

\* \* \* \* \*

UNITED STATES PATENT AND TRADEMARK OFFICE
CERTIFICATE OF CORRECTION

| | | |
|---|---|---|
| PATENT NO. | : 8,583,466 B2 | |
| APPLICATION NO. | : 11/277125 | |
| DATED | : November 12, 2013 | |
| INVENTOR(S) | : Margulies et al. | |

It is certified that error appears in the above-identified patent and that said Letters Patent is hereby corrected as shown below:

On the Title Page

On page 3, column 1, item 56, under "Other Publications", line 4, delete "CenterVu" and insert -- CentreVu --, therefor.

On page 3, column 1, item 56, under "Other Publications", line 12, delete "Redifining" and insert -- Redefining --, therefor.

On page 3, column 2, item 56, under "Other Publications", line 3, delete "survelliance" and insert -- surveillance --, therefor.

On page 3, column 2, item 56, under "Other Publications", line 8, delete "Inbout" and insert -- Inbound --, therefor.

On page 3, column 2, item 56, under "Other Publications", line 9, delete "Amercian" and insert -- American --, therefor.

On page 3, column 2, item 56, under "Other Publications", line 11, delete "Impementation" and insert -- Implementation --, therefor.

On page 3, column 2, item 56, under "Other Publications", line 15, delete "Impelementation" and insert -- Implementation --, therefor.

On page 3, column 2, item 56, under "Other Publications", line 38, delete "Dordrechnt." and insert -- Dordrecht, --, therefor.

Signed and Sealed this
Eighth Day of September, 2015

Michelle K. Lee
*Director of the United States Patent and Trademark Office*

CERTIFICATE OF CORRECTION (continued)
U.S. Pat. No. 8,583,466 B2

In the Drawings

On sheet 9 of 22, figure 9A, under Reference Numeral 912, line 1, delete "Templete" and insert -- Template --, therefor.

On sheet 18 of 22, figure 16, under Reference Numeral 1604, line 1, delete "Extacts" and insert -- Extracts --, therefor.

On Sheet 20 of 22, figure 17B, under Reference Numeral 1632, line 1, delete "Ger" and insert -- Get --, therefor.

On sheet 22 of 22, figure 18, under Reference Numeral 1808, line 1, delete "Woker" and insert -- Worker --, therefor.

On sheet 22 of 22, figure 18, under Reference Numeral 1818, line 2, delete "displayes" and insert -- displays --, therefor.

In the Specification

In column 18, line 6, delete "10" and insert -- 110 --, therefor.

In the Claims

In column 26, line 32, in Claim 19, delete "of of" and insert -- of --, therefor.